US012353167B2

(12) United States Patent
Kanno et al.

(10) Patent No.: US 12,353,167 B2
(45) Date of Patent: Jul. 8, 2025

(54) EXTERNAL ADDITIVE FOR TONER AND TONER

(71) Applicant: CANON KABUSHIKI KAISHA, Tokyo (JP)

(72) Inventors: Ichiro Kanno, Chiba (JP); Kaoru Yoshida, Ibaraki (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 756 days.

(21) Appl. No.: 17/648,368

(22) Filed: Jan. 19, 2022

(65) Prior Publication Data
US 2022/0236656 A1   Jul. 28, 2022

(30) Foreign Application Priority Data

Jan. 25, 2021 (JP) ................................ 2021-009564
Dec. 15, 2021 (JP) ................................ 2021-203284

(51) Int. Cl.
*G03G 9/097* (2006.01)
*C08G 77/08* (2006.01)
*C08G 77/18* (2006.01)
*C08K 9/06* (2006.01)

(52) U.S. Cl.
CPC ......... *G03G 9/09775* (2013.01); *C08G 77/08* (2013.01); *C08G 77/18* (2013.01); *C08K 9/06* (2013.01); *C08K 2201/003* (2013.01)

(58) Field of Classification Search
CPC ....................... G03G 9/09725; G03G 9/09783
See application file for complete search history.

(56) References Cited

U.S. PATENT DOCUMENTS

| 9,057,970 | B2 | 6/2015 | Ida et al. |
| 9,152,088 | B1 | 10/2015 | Kobori et al. |
| 9,348,247 | B2 | 5/2016 | Ida et al. |

(Continued)

FOREIGN PATENT DOCUMENTS

| EP | 3 674 799 A1 | 7/2020 |
| EP | 3 674 804 A1 | 7/2020 |

(Continued)

OTHER PUBLICATIONS

Translation of WO 2005/068537.*

(Continued)

*Primary Examiner* — Peter L Vajda
(74) *Attorney, Agent, or Firm* — VENABLE LLP

(57) ABSTRACT

An external additive for toner comprising a particle of a silicon polymer having a siloxane bond and a Si—O—C bond, wherein in an FT-IR spectrum of the external additive obtained by an ATR method, a maximum peak is present in a range of from 1030 cm$^{-1}$ to 1070 cm$^{-1}$, where an average intensity in a range of from 1015 cm$^{-1}$ to 1025 cm$^{-1}$ of the spectrum is denoted by A and an average intensity in a range of from 1085 cm$^{-1}$ to 1095 cm$^{-1}$ is denoted by B, the A and the B satisfy a following formula (1):

$$0.55 \leq A/B \leq 1.50. \quad (1)$$

12 Claims, 3 Drawing Sheets

(56) References Cited

U.S. PATENT DOCUMENTS

| | | |
|---|---|---|
| 9,348,253 B2 | 5/2016 | Kanno et al. |
| 9,417,540 B2 | 8/2016 | Hashimoto et al. |
| 9,436,112 B2 | 9/2016 | Iwasaki et al. |
| 9,540,483 B2 | 1/2017 | Ida et al. |
| 9,651,883 B2 | 5/2017 | Hama et al. |
| 9,665,026 B2 | 5/2017 | Iwasaki et al. |
| 9,696,644 B2 | 7/2017 | Ida et al. |
| 9,897,934 B2 | 2/2018 | Tamura et al. |
| 10,012,920 B2 | 7/2018 | Shibata et al. |
| 10,036,970 B2 | 7/2018 | Kanno et al. |
| 10,078,281 B2 | 9/2018 | Ida et al. |
| 10,082,743 B2 | 9/2018 | Hama et al. |
| 10,088,765 B2 | 10/2018 | Miyakai et al. |
| 10,146,146 B2 | 12/2018 | Komatsu et al. |
| 10,175,595 B2 | 1/2019 | Onozaki et al. |
| 10,197,936 B2 | 2/2019 | Onozaki et al. |
| 10,203,619 B2 | 2/2019 | Yamashita et al. |
| 10,228,629 B2 | 3/2019 | Tamura et al. |
| 10,274,851 B2 | 4/2019 | Hashimoto et al. |
| 10,353,312 B2 | 7/2019 | Kamae et al. |
| 10,401,748 B2 | 9/2019 | Hashimoto et al. |
| 10,423,086 B2 | 9/2019 | Hama et al. |
| 10,451,986 B2 | 10/2019 | Sano et al. |
| 10,451,990 B2 | 10/2019 | Kamae et al. |
| 10,474,049 B2 | 11/2019 | Onozaki et al. |
| 10,514,624 B2 | 12/2019 | Tamura et al. |
| 10,564,560 B2 | 2/2020 | Onozaki et al. |
| 10,599,060 B2 | 3/2020 | Kanno et al. |
| 10,656,545 B2 | 5/2020 | Kamae et al. |
| 10,775,710 B1 | 9/2020 | Kamae et al. |
| 10,859,931 B2 | 12/2020 | Hashimoto et al. |
| 10,877,386 B2 | 12/2020 | Murayama et al. |
| 10,935,902 B2 | 3/2021 | Kanno et al. |
| 10,955,765 B2 | 3/2021 | Onozaki et al. |
| 10,969,705 B2 | 4/2021 | Shirayama et al. |
| 11,029,617 B2 | 6/2021 | Chimoto et al. |
| 11,131,939 B2 | 9/2021 | Hama et al. |
| 11,181,848 B2 | 11/2021 | Ochi et al. |
| 2008/0226998 A1 | 9/2008 | Ishii |
| 2013/0108955 A1 | 5/2013 | Shibata et al. |
| 2013/0288173 A1 | 10/2013 | Hashimoto et al. |
| 2014/0295341 A1 | 10/2014 | Fomitchev |
| 2014/0329176 A1 | 11/2014 | Kanno et al. |
| 2015/0099227 A1 | 4/2015 | Ida et al. |
| 2016/0109820 A1 | 4/2016 | Hashimoto et al. |
| 2016/0319077 A1 | 11/2016 | Ishizu |
| 2018/0314176 A1 | 11/2018 | Ikeda et al. |
| 2018/0329322 A1 | 11/2018 | Kamikura |
| 2021/0141315 A1 | 5/2021 | Kamae et al. |
| 2021/0181647 A1 | 6/2021 | Hashimoto et al. |
| 2021/0181649 A1 | 6/2021 | Kanno et al. |
| 2021/0181650 A1 | 6/2021 | Hama et al. |
| 2021/0181651 A1 | 6/2021 | Kanno et al. |
| 2021/0278774 A1 | 9/2021 | Hashimoto et al. |
| 2021/0278775 A1 | 9/2021 | Kamae et al. |

FOREIGN PATENT DOCUMENTS

| | | | |
|---|---|---|---|
| JP | 2007-99582 A | 4/2007 | |
| JP | 2018-4949 A | 1/2018 | |
| JP | 2018-72389 A | 5/2018 | |
| JP | 2020-187158 A | 11/2020 | |
| WO | WO 2005/068537 * | 7/2005 | ............... G01F 1/66 |
| WO | 2013/063291 A1 | 5/2013 | |
| WO | 2015/107961 A1 | 7/2015 | |

OTHER PUBLICATIONS

U.S. Appl. No. 17/457,766, filed Dec. 6, 2021, Yuya Chimoto.
U.S. Appl. No. 17/457,822, filed Dec. 6, 2021, Hisasuke Kajihara.
U.S. Appl. No. 17/536,853, filed Nov. 29, 2021, Hisasuke Kajihara.
U.S. Appl. No. 17/542,006, filed Dec. 3, 2021, Masaharu Miura.
U.S. Appl. No. 17/648,330, filed Jan. 19, 2022, Hiroki Watanabe.
U.S. Appl. No. 17/648,333, filed Jan. 19, 2022, Ichiro Kanno.
U.S. Appl. No. 17/654,461, filed Mar. 11, 2022, Yukihiro Abe.
U.S. Appl. No. 17/654,481, filed Mar. 11, 2022, Kazuki Murata.

* cited by examiner

EXTERNAL ADDITIVE FOR TONER AND TONER

BACKGROUND OF THE INVENTION

Field of the Invention

The present disclosure relates to an external additive for toner and a toner for use in an electrophotographic method using the external additive for toner.

Description of the Related Art

In recent years, with the widespread use of electrophotographic full-color copiers, there is an increasing demand for electrophotographic toners suitable for high-speed printing and having long service life. Conventionally, silica is widely known as an external additive used for toners. For example, Japanese Patent Application Publication No. 2007-099582 includes an example in which highly hydrophobic spherical sol-gel silica fine particles are added to toner base particles to improve the charge stability of the toner.

However, in an environment where a toner frequently comes into contact with a member such as a carrier and stress is applied, such as when outputting an image with a low print density for a long time or when outputting an image in a high-temperature and high-humidity environment, silica particles are embedded in the toner particles surface. As a result, the surface state of the toner changes significantly, and there is room for improvement in terms of toner flow stability and charge stability.

Meanwhile, WO 2015/107961 and Japanese Patent Application Publication No. 2018-004949 include examples in which polyalkylsilsesquioxane fine particles are added to a toner base particle to improve the flowability and charge stability of the toner.

Further, WO 2013/063291 includes an example in which it is stated that the addition of a metal oxide-polymer composite material particles including metal oxide particles and a polymer matrix to a toner particle exerts an effect of suppressing the embedment into a toner base particle.

SUMMARY OF THE INVENTION

However, it was found that the techniques described in the abovementioned patent literature cannot suppress a change in external additive fine particles and toner surface when an image with a low print density is output for a long time in a high-temperature and high-humidity environment, and all these techniques still have room for improvement in terms of charge stability of the toner, image density, and color stability.

The present disclosure provides an external additive for toner that has durability stability and charge stability even in a high-temperature and high-humidity environment and can suppress density fluctuation regardless of the image printing ratio, and also provides a toner using the external additive for toner.

The present disclosure relates to an external additive for toner comprising a particle of a silicon polymer having a siloxane bond and a Si—O—C bond, wherein
in an FT-IR spectrum of the external additive obtained by an ATR method,
a maximum peak is present in a range of from 1030 $cm^{-1}$ to 1070 $cm^{-1}$,
where an average intensity in a range of from 1015 $cm^{-1}$ to 1025 $cm^{-1}$ of the spectrum is denoted by A and an average intensity in a range of from 1085 $cm^{-1}$ to 1095 $cm^{-1}$ is denoted by B, the A and the B satisfy a following formula (1):

$$0.55 \leq A/B \leq 1.50. \quad (1)$$

The present disclosure can provide an external additive for toner that has durability stability and charge stability even in a high-temperature and high-humidity environment and can suppress density fluctuation regardless of the image printing ratio, and also provides a toner using the external additive for toner. Further features of the present invention will become apparent from the following description of exemplary embodiments with reference to the attached drawings.

DESCRIPTION OF THE EMBODIMENTS

Figure 1:
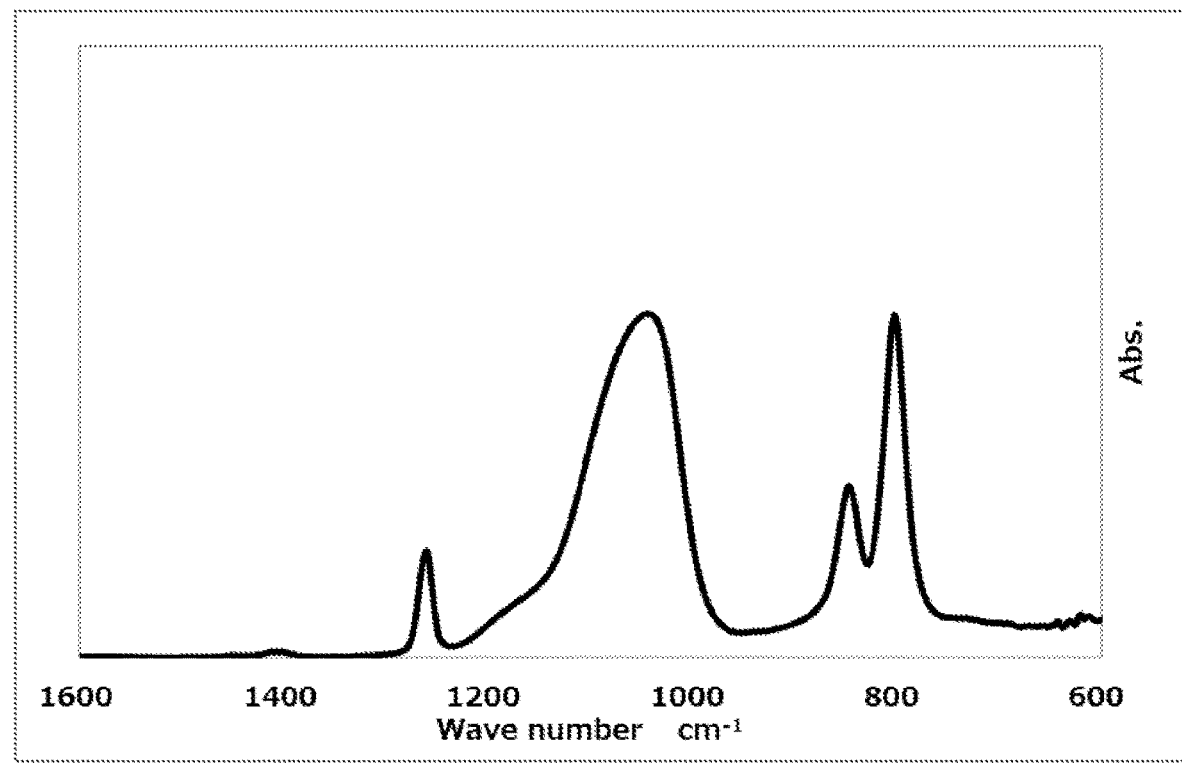
FIG. 1 is an FT-IR spectrum.

In the present disclosure, the notations "from XX to YY" and "XX to YY" representing a numerical value range denote, unless otherwise stated, a numerical value range that includes the lower limit and the upper limit thereof, as endpoints. In a case where numerical value ranges are described in stages, the upper limits and the lower limits of the respective numerical value ranges can be combined arbitrarily.

The present inventors consider that the above effects are exhibited according to the following mechanism. Since a silica particle that has been conventionally used as an external additive for toner is composed of siloxane bonds (Si—O—Si), the particle has a very high crosslinking density and is hard. Therefore, when outputting an image with a low print density for a long time, since the toner particle is softer than the silica particle, frequent contact occurs between a member such as a carrier and silica particles on the toner surface, stress is applied, and silica particles are embedded in the toner particle surface.

Further, a particle including a large number of Si—O—C bonds, such as a polyalkylsilsesquioxane particle, has a low crosslinking density and is soft, so that when the toner is stressed, the polyalkylsilsesquioxane particles themselves may be crushed or fractured.

As a result of diligent studies by the present inventors, it was found that the above problems can be solved by optimizing the content ratio of siloxane bonds (Si—O—Si) and Si—O—C bonds inside an external additive particle.

The present disclosure relates to an external additive for toner comprising a particle of a silicon polymer having a siloxane bond and a Si—O—C bond, wherein
in an FT-IR spectrum of the external additive obtained by an ATR method,
a maximum peak is present in a range of from 1030 $cm^{-1}$ to 1070 $cm^{-1}$,
where an average intensity in a range of from 1015 $cm^{-1}$ to 1025 $cm^{-1}$ of the spectrum is denoted by A and an average intensity in a range of from 1085 $cm^{-1}$ to 1095 $cm^{-1}$ is denoted by B, the A and the B satisfy a following formula (1):

$$0.55 \leq A/B \leq 1.50. \tag{1}$$

The present inventors consider the detailed mechanism as follows.

In the FT-IR spectrum, a peak in the range of from 1015 cm$^{-1}$ to 1025 cm$^{-1}$ indicates stretching vibration of a Si—O—C bond, and a peak in the range of from 1085 cm$^{-1}$ to 1095 cm$^{-1}$ indicates stretching vibration of a siloxane bond (Si—O—Si). Satisfying the formula (1) indicates that the abundance ratios of the Si—O—C bonds and the siloxane bonds (Si—O—Si) are about the same inside the external additive particle, and the crosslinking density inside the external additive particle is in the optimum state.

The crosslinking density inside an external additive particle has a strong correlation with the hardness of the particle, and within the range of the formula (1), the particles themselves have a function of relieving stress applied from the outside. That is, the stress on the toner can be relieved, and the toughness of the particles themselves is high, so that even when an image having a low print density is output for a long time, changes in the surface state of the toner can be suppressed and charge stability can be improved.

$$0.55 \leq A/B \leq 1.50 \tag{1}$$

When AB exceeds 1.50, the number of Si—O—C bonds is much larger than that of the siloxane bonds (Si—O—Si), so that the crosslinking density of the external additive particles becomes low, and the particles themselves are likely to be crushed or fractured. Further, when A/B is less than 0.55, the number of Si—O—C bonds is much smaller than that of the siloxane bonds (Si—O—Si), so that the crosslinking density of the external additive particles becomes high, and the external additive particles are likely to be embedded in the toner particles.

Further, it is preferable that 0.80≤A/B≤1.20. Within this range, the abundance ratio of the Si—O—C bonds and the siloxane bonds (Si—O—Si) inside the external additive particle becomes optimal and preferable from the viewpoint of toner durability stability and charge stability.

A method for producing the external additive for toner, which is the particle of the silicon polymer, is not particularly limited, but it is preferable to form the particles through hydrolysis and polycondensation reaction of a silicon compound (silane monomer) obtained by a sol-gel method. Specifically, particles are preferably formed by polymerizing a mixture of a bifunctional silane having two siloxane bonds and a tetrafunctional silane having four siloxane bonds by hydrolysis and a polycondensation reaction. Silane monomers such as bifunctional silanes and tetrafunctional silanes will be described hereinbelow.

That is, the silicon polymer is preferably a polycondensation polymer of at least one silicon compound selected from the group consisting of bifunctional silanes and at least one silicon compound selected from the group consisting of tetrafunctional silanes. The proportion of bifunctional silane is preferably from 50 mol % to 70 mol %, and more preferably from 61 mol % to 65 mol %. The proportion of tetrafunctional silane is preferably from 30 mol % to 50 mol %, and more preferably from 35 mol % to 39 mol %.

The present inventors have found that the abovementioned effect is exerted by adjusting the mixing ratio of the monomers, the solvent temperature during hydrolysis and condensation reaction, the type of catalyst, the stirring time, the pH of the solution, and the like in the method for producing the external additive for toner.

For example, a method of increasing the mixing ratio of bifunctional silane, lowering the temperature during the condensation reaction, shortening the stirring time, lowering the pH of the solution, and lowering the temperature during hydrolysis can be used to increase the A/B. A method of increasing the mixing ratio of tetrafunctional silane, raising the temperature during the condensation reaction, extending the stirring time, raising the pH of the solution, and raising the temperature during hydrolysis can be used to decrease the A/B.

Further, it is necessary that in the FT-IR spectrum of the external additive for toner obtained by the ATR method, the maximum peak be present in the range of from 1030 cm$^{-1}$ to 1070 cm$^{-1}$. Having the maximum peak in the above range means that the crosslinking density of the Si—O—C bonds and the Si—O—Si bonds is high and a strong three-dimensional network is formed, and in this case, the external additive is strong against an external stress, and deformation and crushing can be suppressed.

The maximum peak is preferably present in the range of from 1040 cm$^{-1}$ to 1055 cm$^{-1}$. The position of the maximum peak can be controlled by the mixing ratio of the monomers.

The external additive for toner has a particle of a silicon polymer having a siloxane bond. The particle of the silicon polymer preferably contains the silicon polymer at 90% by mass or more, and more preferably at 95% by mass or more.

The method for producing the silicon polymer particles is not particularly limited, and for instance the silicon polymer particles may be obtained through dropping of a silane compound onto water, to elicit hydrolysis and a condensation reaction mediated by a catalyst, followed by filtration and drying of the obtained suspension. Particle diameter can be controlled on the basis of for instance the type of the catalyst, the compounding ratio, the reaction start temperature and the dropping time. Examples of the catalyst include, although not limited thereto, acidic catalysts such as hydrochloric acid, hydrofluoric acid, sulfuric acid and nitric acid, and basic catalysts such as aqueous ammonia, sodium hydroxide and potassium hydroxide.

The silicon polymer particles are preferably produced in accordance with the method below. Specifically, the method preferably includes a first step of obtaining a hydrolysis product of a silicon compound; a second step of mixing the resulting hydrolysis product and an alkaline aqueous medium, to elicit a polycondensation reaction of the hydrolysis product; and a third step of mixing the polycondensation reaction product and an aqueous solution, to elicit particle formation. In some cases, hydrophobicized spherical silicon polymer particles may be obtained by further mixing a hydrophobic agent into a dispersion of spherical silicon polymer particles.

In the first step, the silicon compound and a catalyst are brought into contact with each other by a method such as stirring or mixing in an aqueous solution in which an acidic or alkaline substance serving as a catalyst is dissolved in water. As the catalyst, a known catalyst can be preferably used. Specifically, examples of suitable acidic catalysts include acetic acid, hydrochloric acid, hydrofluoric acid, sulfuric acid, nitric acid, and the like, and examples of suitable basic catalysts include aqueous ammonia, sodium hydroxide, potassium hydroxide, and the like.

The amount of the catalyst used may be adjusted, as appropriate, depending on the silicon compound and the type of catalyst. Preferably, the amount of the catalyst used is selected in the range of from $1 \times 10^{-3}$ part by mass to 1 part by mass with respect to 100 parts by mass of water used when hydrolyzing the silicon compound.

Where the amount of the catalyst used is $1 \times 10^{-3}$ parts by mass or more, the reaction proceeds sufficiently. Meanwhile, where the amount of the catalyst used is 1 part by mass or less, the concentration of impurities remaining in the fine particles becomes low, and hydrolysis becomes easy. The amount of water used is preferably from 2 mol to 15 mol with respect to 1 mol of the silicon compound. When the amount of water is 2 mol or more, the hydrolysis reaction proceeds sufficiently, and when the amount of water is 15 mol or less, the productivity is improved.

The reaction temperature is not particularly limited, and the reaction may be conducted at normal temperature or in a heated state, but preferably the reaction is conducted in a state where the temperature is held at from 10 to 60° C., since in that case the hydrolysis product is obtained in a short time and partial condensation reactions of the generated hydrolysis product can be suppressed. The reaction time is not particularly limited, and may be selected as appropriate taking into consideration the reactivity of the silicon compound that is used, the composition of the reaction solution resulting from formulating the silicon compound, the acid and water, and productivity.

In the method for producing the silicon polymer particles, the second step involves mixing the starting solution obtained in the first step and an alkaline aqueous medium, to elicit a polycondensation reaction of a particle precursor. A polycondensation reaction solution is obtained as a result. The alkaline aqueous medium is a solution obtained by mixing an alkaline component, water and, as needed, an organic solvent or the like.

The alkaline component used in the alkaline aqueous medium exhibits basicity, and acts as a neutralizer of the catalyst used in the first step, and as a catalyst of the polycondensation reaction in the second step. Examples of such alkaline components include alkali metal hydroxides such as lithium hydroxide, sodium hydroxide and potassium hydroxide; ammonia; and organic amines such as monomethylamine and dimethylamine.

The use amount of the alkaline component is an amount such that the alkaline component neutralizes an acid and effectively acts as a catalyst of the polycondensation reaction; in a case for instance where ammonia is used as the alkaline component, the amount of the alkaline component may ordinarily be selected within the range from 0.01 mass % to 12.5 mass % relative to 100 parts by mass of the mixture with water and the organic solvent.

In the second step, an organic solvent may be further used in addition to the alkaline component and water, in order to prepare the alkaline aqueous medium. The organic solvent is not particularly limited, so long as it is compatible with water, but an organic solvent is preferable herein that dissolves 10 g or more of water per 100 g at normal temperature and a normal pressure.

Specific examples of the organic solvent include alcohols such as methanol, ethanol, n-propanol, 2-propanol and butanol; polyhydric alcohols such as ethylene glycol, diethylene glycol, propylene glycol, glycerine, trimethylolpropane and hexanetriol; ethers such as ethylene glycol monoethyl ether, acetone, diethyl ether, tetrahydrofuran and diacetone alcohol; and amide compounds such as dimethylformamide, dimethylacetamide and N-methylpyrrolidone.

Alcohol solvents such as methanol, ethanol, 2-propanol or butanol are preferable among the organic solvents enumerated above. In terms of hydrolysis and a dehydration condensation reaction, it is more preferable to select, as the organic solvent, the same alcohol as the alcohol that is eliminated.

The third step involves mixing the polycondensation reaction product obtained in the second step with an aqueous solution, to elicit formation of particles. Water (tap water, pure water or the like) can be suitably used herein as the aqueous solution, but components that are compatible with water, such as salts, acids, alkalis, organic solvents, surfactants or water-soluble polymers may be further added to the water. The temperatures of the polycondensation reaction solution and of the aqueous solution at the time of mixing are not particularly limited, and herein a range from 5 to 70° C. is suitably selected taking into consideration for instance the composition of the solutions, and productivity.

A known method may be adopted, without particular limitations, as the method for recovering the silicon polymer particles. For instance a floating powder may be scooped or filtered, but filtration is preferable since the operation involved is simple and convenient. The filtration method is not particularly limited, and a known apparatus for vacuum filtration, centrifugal filtration, pressure filtration or the like may be selected herein. The filter paper, filter, filter cloth or the like used for filtration are not particularly limited so long these are industrially available, and may be selected as appropriate depending on the apparatus that is used.

The hydrophobicity of the silicon polymer particles may be adjusted by treating the surface of the silicon polymer particles using a known means such as a silane coupling agent or silicone oil.

The monomers used can be selected, as appropriate, depending on the compatibility with the solvent and the catalyst, hydrolyzability, etc., but the tetrafunctional silane is preferably tetraethoxysilane. The bifunctional silane is preferably dimethyldimethoxysilane.

The silicon polymer is preferably a polycondensation polymer of at least one silicon compound selected from the group consisting of silicon compounds having a structure represented by a following formula (2).

(2)

In the formula (2), $R^2$, $R^3$, $R^4$ and $R^5$ independently represent an alkyl group having from 1 to 6 (preferably from 1 to 3, and more preferably 1 or 2) carbon atoms, a phenyl group or a reactive group (for example, a halogen atom, a hydroxy group, an acetoxy group, or an alkoxy group (preferably having from 1 to 6 carbon atoms, and more preferably from 1 to 3 carbon atoms). At least one of $R^2$, $R^3$, $R^4$ and $R^5$ is the reactive group.

$R^2$, $R^3$, $R^4$ and $R^5$ are independently preferably an alkyl group having from 1 to 6 carbon atoms (preferably from 1 to 3 carbon atoms, and more preferably 1 or 2 carbon atoms) or an alkoxy group (preferably having from 1 to 6 carbon atoms, and more preferably from 1 to 3 carbon atoms).

In order to obtain the silicon polymer particles, it is possible to use a silicon compound (tetrafunctional silane) having four reactive groups in one molecule of the formula (2), an organosilicon compound (trifunctional silane) in which $R^2$ in the formula (2) is an alkyl group or a phenyl group and which has three reactive groups ($R^3$, $R^4$, $R^5$), an organosilicon compound (bifunctional silane) in which $R^2$ and $R^3$ in the formula (2) are each an alkyl group or a phenyl group and which has two reactive groups ($R^4$, $R^5$), and an organosilicon compound (monofunctional silane) in which $R^2$, $R^3$, $R^4$ in the formula (2) are each an alkyl group or a phenyl group and which has one reactive group ($R^5$).

These reactive groups are hydrolyzed, addition polymerized and condensation polymerized to form a crosslinked structure, and silicon polymer particles can be obtained. Hydrolysis, addition polymerization and condensation polymerization of $R^3$, $R^4$ and $R^5$ can be controlled by reaction temperature, reaction time, reaction solvent and pH.

The tetrafunctional silane can be exemplified by tetramethoxysilane, tetraethoxysilane, and tetraisocyanatosilane.

The trifunctional silane can be exemplified by methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, methyldiethoxyhydroxysilane, ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, hexyltrihydroxysilane, phenyltrimethoxysilane, phenyltriethoxysilane, phenyltrichlorosilane, phenyltriacetoxysilane, and phenyltrihydroxysilane.

The difunctional silane can be exemplified by di-tert-butyldichlorosilane, di-tert-butyldimethoxysilane, di-tert-butyldiethoxysilane, dibutyldichlorosilane, dibutyldimethoxysilane, dibutyldiethoxysilane, dichlorodecylmethylsilane, dimethoxydecylmethylsilane, diethoxydecylmethylsilane, dichlorodimethylsilane, dimethyldimethoxysilane, diethoxydimethylsilane, and diethyldimethoxysilane.

The monofunctional silane can be exemplified by t-butyldimethylchlorosilane, t-butyldimethylmethoxysilane, t-butyldimethylethoxysilane, t-butyldiphenylchlorosilane, t-butyldiphenylmethoxysilane, t-butyldiphenylethoxysilane, chlorodimethylphenylsilane, methoxydimethylphenylsilane, ethoxydimethylphenylsilane, chlorotrimethylsilane, trimethylmethoxysilane, ethoxytrimethylsilane, triethylmethoxysilane, triethylethoxysilane, tripropylmethoxysilane, tributylmethoxysilane, tripentylmethoxysilane, triphenylchlorosilane, triphenylmethoxysilane, and triphenylethoxysilane.

The number-average particle diameter of primary particles of the external additive for toner is preferably from 0.02 μm to 0.30 μm. When the number-average particle diameter of the primary particles is within the above range, it becomes easy to uniformly cover the toner particle with the external additive. Further, since the stress on the toner can be suppressed, the effect of charge stability can be easily obtained.

When the number-average particle diameter of primary particles of the external additive for toner is 0.02 μm or more, the stress on the toner is reduced even if a large amount of images with a low print density are output for a long time in a harsh environment such as a high-temperature and high-humidity environment, so that the external additive particles are less likely to be embedded in the surface of the toner particle. Further, where the number-average particle diameter is 0.30 μm or less, it becomes difficult for the external additive particles to be separated from the toner particle surface. The number-average particle diameter of primary particles of the external additive for toner is more preferably from 0.05 μm to 0.25 μm, and further preferably from 0.08 μm to 0.18 μm.

The Young's modulus of the external additive for toner is preferably from 2000 MPa to 9000 MPa. Where the Young's modulus is within the above range, when the toner is stressed by a member such as a carrier, the stress can be relieved, and the embedding of the external additive particles into the surface of the toner particles can be further suppressed.

Where the Young's modulus is 2000 MPa or more, the external additive particles themselves are unlikely to be fractured when the toner is stressed by a member such as a carrier. Further, where the Young's modulus is 9000 MPa or less, when the toner is stressed by a member such as a carrier, the stress can be easily relieved, and the embedding of the external additive particles into the surface of the toner particles can be further suppressed. Therefore, the surface state of the toner is unlikely to change, and the change in the charge of the toner can be further suppressed. The Young's modulus of the external additive for toner is more preferably from 3000 MPa to 7000 MPa. The Young's modulus of the external additive for toner can be controlled by changing the mixing ratio of the monomers, the conditions for hydrolysis and condensation, the pH, and the type of catalyst.

The yield point stress of the external additive for toner is preferably from 1200 MPa to 10000 MPa.

Where the yield point stress is 1200 MPa or more, it is possible to suppress the fracture of the external additive particles themselves when the toner is stressed by a member such as a carrier.

Meanwhile, where the yield point stress is 10000 MPa or less, the stress can be easily relieved when the toner is stressed by a member such as a carrier, and the embedding of the external additive particles into the surface of the toner particles can be suppressed. Therefore, the surface state of the toner does not change easily, and it is easy to suppress the change in the charge of the toner.

The yield point stress is more preferably from 1400 MPa to 1800 MPa. The yield point stress of the external additive for toner can be controlled by changing the mixing ratio of the monomers, the conditions for hydrolysis and condensation, the pH, and the type of catalyst.

It is preferable that the surface of the external additive for toner be treated with a hydrophobizing agent. That is, particles of the external additive for toner are preferably silicon polymer particles surface-treated with a hydrophobizing agent. The hydrophobizing agent is not particularly limited, but is preferably an organosilicon compound.

The hydrophobizing agent can be exemplified by an alkylsilazane compound such as hexamethyldisilazane, an alkylalkoxysilane compound such as diethyldiethoxysilane, trimethylmethoxysilane, methyltrimethoxysilane, and butyltrimethoxysilane, a fluoroalkylsilane compound such as trifluoropropyltrimethoxysilane, a chlorosilane compound such as dimethyldichlorosilane and trimethylchlorosilane, a siloxane compound such as octamethylcyclotetrasiloxane, a silicone oil, a silicone varnish, and the like.

By hydrophobizing the surface of the external additive particles, it is possible to further suppress changes in the charge quantity of the toner in a high-temperature and high-humidity environment. The external additive for toner is preferably surface-treated with at least one compound selected from the group consisting of an alkylsilazane compound, an alkylalkoxysilane compound, a chlorosilane compound, a siloxane compound and a silicone oil. Further, from the viewpoint of charge stability, it is more preferable that the external additive for toner be surface-treated with an alkylsilazane compound.

From the viewpoint of charge stability, the degree of hydrophobization of the external additive for toner that is obtained by the methanol titration method is preferably from 40% to 80%, more preferably from 50% to 60%, and further preferably from 50% to 55%.

In the chart obtained by $^{29}$Si-NMR measurement of the external additive for toner, where the total peak area attributed to the silicon polymer is denoted by SA, the peak area attributed to the Q unit structure is denoted by S4, the peak area attributed to the T unit structure is denoted by S3, and the peak area attributed to the D unit structure is denoted by S2, it is preferable that the SA, the S4, the S3 and the S2 satisfy the following formulas (I) to (III).

$$0.20 \le S4/SA \le 0.60 \quad \text{(I)}$$

$$0.00 \le S3/SA \le 0.50 \quad \text{(II)}$$

$$0.20 \le S2/SA \le 0.70 \quad \text{(III)}$$

Where the formulas (I) to (III) are satisfied, when the toner is stressed by a member such as a carrier, it is possible to prevent the external additive particles from being embedded in the toner particle surface and prevent the fracture of the external additive particles themselves.

Further, it is more preferable that 0.30≤S4/SA≤0.50, 0.00≤S3/SA≤0.10, and 0.50≤S2/SA≤0.70. Within these ranges, the abundance ratio of the Si—O—C bonds and siloxane bonds (Si—O—Si) inside the external additive particle is optimal, which is more preferable from the viewpoint of toner durability stability and charge stability. S4/SA, S3/SA, and S2/SA can be controlled by the selection of the silicon compound, the mixing ratio of the silicon compound, and the hydrolysis and condensation conditions.

In the FT-IR spectrum of the external additive for toner obtained by the ATR method, a methylsilyl group shows a peak in the range of from 1200 cm$^{-1}$ to 1300 cm$^{-1}$. Having a peak derived from the methylsilyl group in this range improves the charging performance in a high-humidity environment. Further, it is more preferable to have the peak in the range of from 1250 cm$^{-1}$ to 1300 cm$^{-1}$, and it is further preferable to have the peak in the range of from 1250 cm$^{-1}$ to 1265 cm$^{-1}$. Where the peak is shown in the range of from 1250 cm$^{-1}$ to 1300 cm$^{-1}$, it means that the binding energy of the methylsilyl group, that is, the mechanical strength is high, and the durability stability and the charge stability of the toner are improved.

From the viewpoint of durability stability and charge stability of the toner, the average circularity of the external additive for toner is preferably from 0.850 to 0.950, and more preferably from 0.880 to 0.930. The average circularity can be controlled by the mixing ratio of the monomers and the condensation conditions.

The toner comprises a toner particle including a binder resin and an external additive for toner, and the external additive for toner is the abovementioned external additive for toner. From the viewpoint of charge stability, the content of the external additive for toner in the toner is preferably from 0.1 part by mass to 20.0 parts by mass with respect to 100 parts by mass of the toner particles. The range of from 0.5 parts by mass to 15.0 parts by mass is more preferable, and the range of from 1.0 parts by mass to 10.0 parts by mass is further preferable.

Where the content of the external additive for toner is 0.1 parts by mass or more, even when a large amount of images with a low print density are output for a long time in a harsh environment such as a high-temperature and high-humidity environment, stress applied to toner can be suppressed, and durability stability and charge stability are improved. Further, when the content of the external additive for toner is 20.0 parts by mass or less, even when an image having a high print density is output for a long time, filming of the external additive particles on the carrier or the photosensitive member can be suppressed.

<Binder Resin>

The binder resin used in the toner is not particularly limited, and for instance the following polymers can be used. For example monopolymers of styrene and substituted styrene, such as polystyrene, poly-p-chlorostyrene and polyvinyltoluene; styrene copolymers such as styrene-p-chlorostyrene copolymer, styrene-vinyltoluene copolymer, styrene-vinylnaphthalene copolymer, styrene-acrylate ester copolymers, styrene-methacrylate ester copolymers, styrene-α-chloromethyl methacrylate copolymer, styrene-acrylonitrile copolymer, styrene-vinyl methyl ether copolymer, styrene-vinyl ethyl ether copolymer, styrene-vinyl methyl ketone copolymer and styrene-acrylonitrile-indene copolymer; and polyvinyl chloride, phenol resin, natural resin-modified phenol resin, natural resin-modified maleic acid resin, acrylic resin, methacrylic resin, polyvinyl acetate, silicone resin, polyester resin, polyurethane resin, polyamide resin, furan resin, epoxy resin, xylene resin, polyvinylbutyral resin, terpene resin, coumarone-indene resin and petroleum-based resin may be used. Preferred among the foregoing are polyester resins, from the viewpoint of durability stability and charging stability.

<Colorant>

A colorant may be used in the toner particle. The colorant may also be contained in the toner particle. The following are examples of colorants. Examples of black colorants include carbon black, and blacks obtained by color adjustment of blending yellow, magenta and cyan colorants. A pigment may be used alone as the colorant, but from the standpoint of image quality with full-color images, preferably a dye and a pigment are used together to improve the color clarity.

Examples of magenta pigments include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. Pigment Violet 19; and C.I. Vat Red 1, 2, 10, 13, 15, 23, 29 and 35.

Examples of magenta dyes include C.I. Solvent Red 1, 3, 8, 23, 24, 25, 27, 30, 49, 81, 82, 83, 84, 100, 109 and 121; C.I. Disperse Red 9; C.I. Solvent Violet 8, 13, 14, 21 and 27; oil-soluble dyes such as C.I. Disperse Violet 1; and basic dyes such as C.I. Basic Red 1, 2, 9, 12, 13, 14, 15, 17, 18, 22, 23, 24, 27, 29, 32, 34, 35, 36, 37, 38, 39 and 40 and C.I. Basic Violet 1, 3, 7, 10, 14, 15, 21, 25, 26, 27 and 28.

Examples of cyan pigments include C.I. Pigment Blue 2, 3, 15:2, 15:3, 15:4, 16 and 17; C.I. Vat Blue 6; C.I. Acid Blue 45, and copper phthalocyanine pigments having 1 to 5 phthalimidomethyl groups substituted on a phthalocyanine skeleton. Examples of cyan dyes include C.I. Solvent Blue 70.

Examples of yellow pigments include C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. Vat Yellow 1, 3, and 20. Examples of yellow dyes include C.I. Solvent Yellow 162. The content of the colorant is preferably from 0.1 to 30 mass parts per 100 mass parts of the binder resin.

<Wax>

Wax may be used in the toner particle. Examples of waxes include the following. Examples of the wax include the following: hydrocarbon waxes such as low molecular weight polyethylene, low molecular weight polypropylene, alkylene copolymer, microcrystalline wax, paraffin wax and Fischer-Tropsch wax; hydrocarbon wax oxides such as polyethylene oxide wax, and block copolymers of these; waxes consisting primarily of fatty acid esters, such as carnauba wax; and partially or fully deoxidized fatty acid esters, such as deoxidized carnauba wax.

Other examples include the following: saturated linear fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubyl alcohol, seryl alcohol and melissyl alcohol; polyvalent alcohols such as sorbitol; esters of fatty acids such as palmitic acid, stearic acid, behenic acid and montanic acid with alcohols such as stearyl alcohol, aralkyl alcohol, behenyl alcohol, carnaubyl alcohol, seryl alcohol and mellisyl alcohol; fatty acid amides such as linoleamide, oleamide and lauramide; saturated fatty acid bisamides such as methylenebis stearamide, ethylenebis capramide, ethylenebis lauramide and hexamethylenebis stearamide; unsaturated fatty acid amides such as ethylenebis oleamide, hexamethylenebis oleamide, N,N'-dioleyladipamide and N,N'-dioleylsebacamide; aromatic bisamides such as m-xylenebis stearamide and N,N'-distearylisophthalamide; fatty acid metal salts (commonly called metal soaps) such as calcium stearate, calcium laurate, zinc stearate and magnesium stearate; aliphatic hydrocarbon waxes grafted with vinyl monomers such as styrene or acrylic acid; partially esterified products of fatty acids and polyvalent alcohols, such as behenic acid monoglyceride; and methyl ester compounds with hydroxyl groups obtained by hydrogenation of plant-based oils and fats. The content of the wax is preferably from 2.0 parts by mass to 30.0 parts by mass, relative to 100 parts by mass of the binder resin.

<Charge Control Agent>

The toner particle may comprise a charge control agent as necessary. A known charge control agent may be used, but a metal compound of an aromatic carboxylic acid is especially desirable because it is colorless and yields a toner particle that has a rapid charging speed and can stably maintain a fixed charge quantity.

Examples of negatively-charging charge control agents include salicylic acid metal compounds, naphthoic acid metal compounds, dicarboxylic acid metal compounds, polymeric compounds having sulfonic acids or carboxylic acids in the side chains, polymeric compounds having sulfonic acid salts or sulfonic acid esters in the side chains, polymeric compounds having carboxylic acid salts or carboxylic acid esters in the side chains, and boron compounds, urea compounds, silicon compounds and calixarenes.

Examples of the positive charge control agent include a quaternary ammonium salt, a polymer compound having the quaternary ammonium salt in a side chain, a guanidine compound, and an imidazole compound. The charge control agent may be added internally or externally to the toner particle. The amount of the charge control agent added is preferably from 0.2 parts by mass to 10 parts by mass with respect to 100 parts by mass of the binder resin.

<Inorganic Fine Particles>

The toner may include, if necessary, other inorganic fine particles in addition to the above-mentioned external additive for toner. The inorganic fine particles may be internally added to the toner particle, or may be mixed with the toner particle as an external additive. When contained as an external additive, inorganic fine particles such as silica fine particles, titanium oxide fine particles, and aluminum oxide fine particles are preferable. The inorganic fine particles are preferably hydrophobized with a hydrophobizing agent such as a silane compound, a silicone oil or a mixture thereof.

As the external additive for improving the flowability, inorganic fine particles having a specific surface area of from 50 m$^2$/g to 400 m$^2$/g or less are preferable. Inorganic fine particles having a specific surface area in the above range may be used in combination with an external additive for toner in order to achieve both improvement in flowability and stabilization of durability.

The inorganic fine particles are preferably used in an amount of from 0.1 parts by mass to 10.0 parts by mass with respect to 100 parts by mass of the toner particle. When the above range is satisfied, the effect of charge stability can be easily obtained. The content of the above-mentioned external additive for toner is preferably from 50% by mass to 100% by mass, more preferably from 80% by mass to 100% by mass, and still more preferably from 90% by mass to 100% by mass, based on the total amount of the external additive.

<Developer>

A toner can be used as a one-component developer, but it can also be mixed with a magnetic carrier and used as a two-component developer in order to further improve dot reproducibility and to supply a stable image for a long time. That is, in a two-component developer containing a toner and a magnetic carrier, the toner is preferably the above-mentioned toner.

Generally well-known substances such as, for example, iron oxide, unoxidized iron powder; metal particles such as particles of iron, lithium, calcium, magnesium, nickel, copper, zinc, cobalt, manganese, chromium, and rare earths, particles of alloys thereof, and particles of oxides thereof; a magnetic substance such as a ferrite; a magnetic substance-dispersed resin carrier (so-called resin carrier) including the magnetic substance and a binder resin that holds the magnetic substance in a dispersed state can be used as the magnetic carrier. The mixing ratio of the magnetic carrier and the toner is preferably such that the toner concentration in the two-component developer is from 2% by mass to 15% by mass, and more preferably from 4% by mass to 13% by mass.

Method for Producing a Toner Particle

The method for producing the toner particle is not particularly limited, and a known production method such as suspension polymerization, emulsification aggregation, melt-kneading or dissolution suspension can be resorted to. A toner can then be obtained by mixing the above toner external additive, and other external additives as needed, with the obtained toner particle.

Mixing of the toner particle and the external additive can be accomplished using a mixing device such as a double-cone mixer, a V-type mixer, a drum-type mixer, a super mixer, a Henschel mixer, a Nauta mixer, Mechano Hybrid (by Nippon Coke & Engineering Co., Ltd.) or Nobilta (by Hosokawa Micron Corporation).

From the viewpoint of toner durability stability and charge stability, the Young's modulus of the toner particle is preferably from 2000 MPa to 9000 MPa, and more preferably from 2800 MPa to 5500 MPa. From the viewpoint of toner durability stability and charge stability, the yield point stress of the toner particle is preferably from 500 MPa to 10000 MPa, and more preferably from 600 MPa to 1600 MPa.

The measurement methods for various physical properties will be explained below.

<Separation of External Additive Particles and Toner Particles from Toner>

It is also possible to measure each physical property by using the external additive separated from the toner by using the following method. A total of 200 g of sucrose (manufactured by Kishida Chemical Co., Ltd.) is added to 100 mL of ion-exchanged water and dissolved in a hot water bath to prepare a sucrose concentrate. A total of 31 g of the sucrose concentrate and 6 mL of Contaminone N (a 10% by mass aqueous solution of a neutral detergent for cleaning precision measuring instruments; has pH 7 and includes a non-ionic surfactant, an anionic surfactant, and an organic builder; manufactured by Wako Pure Chemical Industries, Ltd.) are placed in a centrifuge tube to prepare a dispersion liquid. A total of 1 g of toner is added to the dispersion liquid, and the toner lumps are loosened with a spatula or the like.

The centrifuge tube is shaken with a shaker ("KM Shaker" (model: V.SX), manufactured by Iwaki Sangyo Co., Ltd.) for 20 min under the condition of 350 reciprocations per minute. After shaking, the solution is transferred to a glass tube for a swing rotor (50 mL), and centrifugation is performed at 3500 rpm for 30 min with a centrifuge.

In the glass tube after centrifugation, the toner is present in the uppermost layer, and the external additive for toner is present on the aqueous solution side of the lower layer. The aqueous solution of the lower layer is collected and centrifuged to separate the sucrose and the external additive for toner, and the external additive for toner is collected. If necessary, centrifugation is repeated, and after sufficient separation, the dispersion liquid is dried and an external additive for toner is collected. When a plurality of external additives for toner are added, the external additives for toner can be sorted by using a centrifugation method or the like.

<Method for Measuring Number-Average Particle Diameter of Primary Particles of External Additive for Toner>

The number-average particle diameter of primary particles of external additive for toner is measured in accordance with a centrifugal sedimentation method. Specifically, 0.01 g of dried external additive particles are placed in a 25 ml glass vial, and 0.2 g of a 5% Triton solution and 19.8 g of RO water are added thereto, to produce a solution. Next, the probe (the tip within the leading end) of an ultrasonic disperser is immersed in that solution, to elicit ultrasonic dispersion at an output of 20 W for 15 minutes, and obtain a dispersion as a result. The number-average particle diameter of primary particles is measured next, using this dispersion, with the help of a centrifugal sedimentation particle size distribution measuring device DC24000 by CPS Instruments Inc. Disc rotational speed is set to 18000 rpm, and true density is set to 1.3 g/cm$^3$. Prior to measurement, the device is calibrated using polyvinyl chloride particles having an average particle diameter of 0.476 µm.

Method for Measuring Softening Temperature (Tm) of Binder Resin

The softening temperature of the resin is measured using a constant load extrusion type capillary rheometer "Flow Tester CFT-500D" (flow characteristic evaluation device, manufactured by Shimadzu Corporation) according to the manual provided the device. In this device, the temperature of a measurement sample filled in a cylinder is raised and the sample is melted while applying a constant load from the top of the measurement sample with a piston, and the melted measurement sample is extruded from a die at the bottom of the cylinder. A flow curve showing the relationship between the piston descent amount and the temperature can be obtained.

In the present disclosure, the "melting temperature in the ½ method" described in the manual provided with "Flow Tester CFT-500D" (flow characteristic evaluation device) is defined as the softening temperature (Tm). The melting temperature in the ½ method is calculated as follows.

First, ½ of the difference between the piston descent amount at the end of the outflow (outflow end point, Smax) and the piston descent amount at the start of the outflow (minimum point, Smin) is obtained (it is denoted by X; X=(Smax−Smin)/2). The temperature on the flow curve when the piston descent amount is the sum of X and Smin is defined as the melting temperature in the ½ method.

A measurement sample of a columnar shape with a diameter of 8 mm is prepared by compression molding about 1.0 g of resin at 10 MPa for 60 sec by using a tablet molding compressor (for example, standard manual type Newton Press NT-100H, manufactured by NPA System Co., Ltd.) in an environment of 25° C. Specific operations in the measurement are performed according to the manual provided with the device.

The measurement conditions for CFT-500D are as follows.

Test mode: heating method
Starting temperature: 50° C.
Achieved temperature: 200° C.
Measurement interval: 1.0° C.
Heating rate: 4.0° C./min
Piston cross-sectional area: 1.000 cm$^2$
Test load (piston load): 10.0 kgf (0.9807 MPa)
Preheating time: 300 sec
Die hole diameter: 1.0 mm
Die length: 1.0 mm Method for Measuring the Weight-Average Particle Diameter (D4) of the Toner Particle The weight-average particle diameter (D4) of the toner particle is determined by carrying out the measurements in 25,000 channels for the number of effective measurement channels and performing analysis of the measurement data, using a "Coulter Counter Multisizer 3" (registered trademark, Beckman Coulter, Inc.), a precision particle size distribution measurement instrument operating on the pore electrical resistance method and equipped with a 100-µm aperture tube, and using the accompanying dedicated software, i.e., "Beckman Coulter Multisizer 3 Version 3.51" (Beckman Coulter, Inc.), to set the measurement conditions and analyze the measurement data.

The aqueous electrolyte solution used for the measurements is prepared by dissolving special-grade sodium chloride in deionized water to provide a concentration of approximately 1 mass % and, for example, "ISOTON II"

(Beckman Coulter, Inc.) can be used. The dedicated software is configured as follows prior to measurement and analysis.

In the "modify the standard operating method (SOM)" screen in the dedicated software, the total count number in the control mode is set to 50000 particles; the number of measurements is set to 1 time; and the Kd value is set to the value obtained using "standard particle 10.0 μm" (Beckman Coulter, Inc.). The threshold value and noise level are automatically set by pressing the threshold value/noise level measurement button. In addition, the current is set to 1,600 μA; the gain is set to 2; the electrolyte solution is set to ISOTON II; and a check is entered for the post-measurement aperture tube flush.

In the "setting conversion from pulses to particle diameter" screen of the dedicated software, the bin interval is set to logarithmic particle diameter; the particle diameter bin is set to 256 particle diameter bins; and the particle diameter range is set to from 2 μm to 60 μm. The specific measurement procedure is as follows.

(1) Approximately 200 mL of the above-described aqueous electrolyte solution is introduced into a 250-mL round-bottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) Approximately 30 mL of the aqueous electrolyte solution is introduced into a 100-mL flatbottom glass beaker. To this is added approximately 0.3 mL of the dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.) as a dispersing agent.

(3) A prescribed amount of deionized water is introduced into the water tank of the ultrasound disperser "Ultrasonic Dispersion System Tetora 150" (Nikkaki Bios Co., Ltd.), which has an electrical output of 120 W and is equipped with two oscillators (oscillation frequency=50 kHz) disposed such that the phases are displaced by 180°, and approximately 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the toner particle is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the dispersed toner-containing aqueous electrolyte solution prepared in (5) is dripped into the roundbottom beaker set in the sample stand as described in (1) with adjustment to provide a measurement concentration of approximately 5%. Measurement is then performed until the number of measured particles reaches 50000.

(7) The measurement data is analyzed by the dedicated software provided with the instrument and the weight-average particle diameter (D4) is calculated. When set to graph/volume % with the dedicated software, the "average diameter" on the analysis/volume statistical value (arithmetic average) screen is the weight-average particle diameter (D4).

<Method for Measuring Average Circularity of Particles of External Additive for Toner, Toner Particles, and Toner>

The average circularity is used as a simple method for quantitatively representing the shape of particles. Particles in the range of from 0.01 μm to 400 μm in equivalent circle diameter are measured using a flow-type particle image analyzer FPIA-3000 manufactured by Sysmex Corporation, the circularity of the measured particles is determined by the following formula, and the value obtained by dividing the total circularity by the total number of particles is defined as the average circularity. The number of particles to be measured is 5000.

$$\text{Circularity } a = L0/L$$

(in the formula, L0 indicates the peripheral length of a circle having the same projected area as the particle image, and L indicates the peripheral length of the particle projected image when image processing is performed at an image processing resolution of 512×512 (pixels of 0.3 μm×0.3 μm)).

Method for Measuring FT-IR Spectrum of External Additive for Toner

The FT-IR spectrum is measured by the ATR method using a Fourier transform infrared spectroscopic analyzer (Spectrum One: manufactured by PerkinElmer Co.) equipped with a universal ATR measurement accessory (Universal ATR Sampling Accessory). The specific measurement procedure is as follows. The incident angle of infrared light ($\lambda$=5 μm) is set to 45°. As the ATR crystal, an ATR crystal of Ge (refractive index=4.0) is used. Other conditions are as follows.

Range
Start: 4000 cm$^{-1}$
End: 600 cm$^{-1}$
Duration
Scan number: 16
Resolution: 4.00 cm$^{-1}$
Advanced: with $CO_2/H_2O$ correction (1) An ATR crystal of Ge (refractive index=4.0) is attached to the apparatus.
(2) Scan type is set to Background, Units are to EGY, and the background is measured.
(3) Scan type is set to Sample, and Units are set to A.
(4) A total of 0.01 g of the sample is weighed on the ATR crystal.
(5) The sample is pressurized with a pressure arm (Force Gauge is 90).
(6) The sample is measured.
(7) The obtained FT-IR spectrum is subjected to baseline correction by Automatic Correction.
(8) The maximum value and wave number of the absorption peak intensity in the range of from 600 cm$^{-1}$ to 4000 cm$^{-1}$ is calculated, and the position of the maximum peak is confirmed.
(9) The average value (A) of the absorption peak intensity in the range of from 1015 cm$^{-1}$ to 1025 cm$^{-1}$ is calculated.
(10) The average value (B) of the absorption peak intensity in the range of from 1085 cm$^{-1}$ to 1095 cm$^{-1}$ is calculated.

AB is calculated using A and B obtained as described above.

Further, in the obtained spectrum, the presence or absence of an absorption peak is confirmed in the range of from 1200 cm$^{-1}$ to 1300 cm$^{-1}$. The absorption peak in the range of from 1200 cm$^{-1}$ to 1300 cm$^{-1}$ represents stretching vibration of Si—CH$_3$. Si—CH$_3$ is a functional group having hydrophobicity, and it is preferable to have an absorption peak in this range from the viewpoint of improving charge stability in a high-humidity environment. Further, it is preferable to have a peak in the range of from 1250 cm$^{-1}$ to 1300 cm$^{-1}$ from the viewpoint of durability stability.

<Method for Measuring Degree of Hydrophobicity of External Additive for Toner>

The degree of hydrophobicity of the external additive for toner is calculated by a methanol titration method. Specifically, the degree of hydrophobicity is measured by the following procedure. Methanol is added dropwise from a burette to a mixture obtained by adding 0.5 g of particles of the external additive for toner to 50 ml of RO until the entire amount of the external additive for toner is wetted. The dropwise addition is performed while stirring the mixture.

Whether the entire amount is wetted is determined by whether the entire external additive for toner that was floating on the water surface is submerged in the liquid and suspended in the liquid. At this time, the value of the volume percentage of methanol in the total amount of the methanol that was dropwise added and the mixed solution at the end of dropwise addition is taken as the degree of hydrophobicity. The higher the value of the degree of hydrophobicity, the higher the hydrophobicity.

<Method for Measuring the Abundance Ratio of Constituent Compounds of External Additive for Toner by Solid-State $^{29}$Si-NMR>

In solid-state $^{29}$Si-NMR, peaks are detected in shift regions that differ depending on the structure of the functional group bonded to Si of the constituent compound of the external additive for toner. By specifying each peak position using a standard sample, the structure bonded to Si can be specified. Further, the abundance ratio of each constituent compound can be calculated from the obtained peak area. The ratio of the peak area of the Q unit structure, the T unit structure, and the D unit structure to the total peak area can be obtained by calculation.

Specifically, the measurement conditions for solid-state $^{29}$Si-NMR are as follows.

Equipment: JNM-ECX5002 (JEOL RESONANCE)
Temperature: room temperature
Measurement method: DDMAS method $^{29}$Si 45°
Sample tube: zirconia, 3.2 mm in diameter
Sample: filled in powder form in the sample tube
Sample rotation speed: 10 kHz
Relaxation delay: 180 s
Scan: 2000

After the measurement, peaks are separated for the M unit structure, D unit structure, T unit structure, and Q unit structure by curve fitting a plurality of silane components having different substituents and bonding groups of the sample or external additive for toner, and the area of each peak is calculated.

Curve fitting is performed using EXcalibur for Windows (registered trademark) version 4.2 (EX series), which is software for JNM-EX400 manufactured by JEOL Ltd. Measurement data are read by clicking "1D Pro" from a menu icon. Next, "Curve fitting function" is selected from "Command" on a menu bar, and curve fitting is performed. Curve fitting for each component is performed so that the difference (combined peak difference) between the combined peak obtained by combining the peaks obtained by curve fitting and the peak of the measurement result is the smallest.

$$M \text{ unit structure: } (Ra)(Rb)(Rc)SiO_{1/2} \tag{S1}$$

$$D \text{ unit structure: } (Rd)(Re)Si(O_{1/2})_2 \tag{S2}$$

$$T \text{ unit structure: } RfSi(O_{1/2})_3 \tag{S3}$$

$$Q \text{ unit structure: } Si(O_{1/2})_4 \tag{S4}$$

$$(S1 + S2 + S3 + S4) = SA.$$

Ra, Rb, Rc, Rd, Re and Rf in the formulas (S1), (S2) and (S3) are each an organic group such as a hydrocarbon group having from 1 to 6 carbon atoms (for example, an alkyl group) or a halogen atom bonded to silicon. When it is necessary to confirm the structure in more detail, the measurement results of $^{13}$C-NMR and $^1$H-NMR may be identified together with the measurement results of $^{29}$Si-NMR. S2/SA, S3/SA and S4/SA are calculated from SA, S2, S3 and S4 thus obtained.

Method for Confirming the Surface Treatment Agent for External Additive for Toners The surface treatment agent for the external additive for toner is analyzed by pyrolysis-GC-MS (gas chromatography-mass spectrometry). Specifically, the measurement conditions are as follows.

Equipment: GC6890A (manufactured by Agilent Technologies, Inc.), pyrolyzer (manufactured by Japan Analytical Industry Co., Ltd.)
Column: HP-5 ms 30 m
Pyrolysis temperature: 590° C.

By specifying each peak position of the profile obtained by the measurement using a standard sample, the surface treatment agent for the external additive for toner is specified.

Method for Measuring Young's Modulus and Yield Point Stress of External Additive for Toner and Toner Particle The Young's modulus and yield point stress of the external additive for toner and toner particle can be obtained from a microcompression test using Hysitron PI 85L PicoIndenter (manufactured by Bruker Co.).

The Young's modulus (MPa) is calculated from the slope of the displacement (nm) obtained by measurement and the profile (load displacement curve) of the test force (μN). In addition, the yield point stress (MPa) is calculated from the yield point (change point) of the profile. Specifically, the yield point stress is calculated by dividing the stress applied to the measurement indenter at the yield point by the area of the measurement surface of the measurement indenter.

Device/Jigs
Base system: Hysitron PI 85L
Measurement indenter: a flat-end indenter with a circular tip with a diameter of 1
SEM used: Thermo Fisher Versa 3D
SEM conditions: −10° tilt, 13 pA at 10 keV
Measurement Conditions
Measurement mode: displacement control
Maximum displacement: 30 nm
Displacement speed: 1 nm/sec
Retention time: 2 sec
Unloading speed: 5 nm/sec Analysis Method Hertz analysis is applied to the obtained load-displacement curve when compressing from 0 nm to 10 nm, and the Young's modulus and yield point stress of each particle are calculated.

Sample Adjustment

A silicon wafer with an external toner additive or toner particle attached thereto is used.

Examples

The present invention will be described in more concrete terms with reference to the examples illustrated below. However, these examples are not meant to limit the present invention in any way. Unless otherwise stated, the language "parts" in the formulations below refers to parts by mass in all instances.

<Production Example of External Additive Particles 1 for Toner>

1. Hydrolysis Step

A total of 43.2 g of RO water and 0.008 g of acetic acid as a catalyst were put in a 200 ml beaker and stirred at 45° C. To this, 27.2 g of tetraethoxysilane and 27.2 g of dimethyldimethoxysilane were added, followed by stirring for 1.5 h to obtain a raw material solution.

2. Polycondensation Step

A total of 68.8 g of RO water, 340.0 g of methanol, and 2.0 g of 25% ammonia water were put into a 1000 ml beaker and stirred at 30° C. to prepare an alkaline aqueous medium. The raw material solution obtained in "1. Hydrolysis step" was added dropwise over 1 min to this alkaline aqueous medium. The mixed solution after the dropwise addition of the raw material solution was stirred as it was at 30° C. for 1.5 h to advance the polycondensation reaction and obtain a polycondensation reaction solution.

3. Particle Formation Step

A total of 1000 g of RO water was put in a 2000 ml beaker followed by stirring at 25° C. The polycondensation reaction solution obtained in "2. Polycondensation step" was added dropwise over 10 min. As soon as the polycondensation reaction liquid was mixed with water, it became cloudy, and a dispersion liquid including silicon polymer particles having a siloxane bond was obtained.

4. Hydrophobization Step

A total of 27.1 g of hexamethyldisilazane as a hydrophobizing agent was added to the dispersion liquid including silicon polymer particles having a siloxane bond that was obtained in "3. Particle formation step", followed by stirring at 60° C. for 2.5 h. After the dispersion liquid was allowed to stand for 5 min, the powder precipitated in the lower part of the solution was collected by suction filtration and dried under reduced pressure at 120° C. for 24 h to obtain external additive particles 1 for toner. The number-average particle diameter of primary particles of the obtained external additive particles 1 for toner was 0.12 μm. Table 1 shows the physical characteristics of the external additive particles 1 for toner. The FT-IR spectrum of the external additive particles 1 for toner is shown in FIG. 1.

<Production Example of External Additive Particles 2 for Toner>

External additive particles 2 for toner were obtained in the same manner as in the production example of external additive particles 1 for toner, except that the amount of hexamethyldisilazane used in the hydrophobization step was changed to 16.3 g. Table 1 shows the physical characteristics of the obtained external additive particles 2 for toner.

<Production Example of External Additive Particles 3 for Toner>

External additive particles 3 for toner were obtained in the same manner as in the production example of external additive particles 1 for toner, except that the amount of hexamethyldisilazane used in the hydrophobization step was changed to 37.9 g. Table 1 shows the physical characteristics of the obtained external additive particles 3 for toner.

<Production Example of External Additive Particles 4 for Toner>

External additive particles 4 for toner were obtained in the same manner as in the production example of external additive particles 1 for toner, except that the stirring temperature in the hydrolysis step was changed to 50° C., and the amount of 25% aqueous ammonia used in the polycondensation step was changed to 1.5 g. Table 1 shows the physical characteristics of the obtained external additive particles 4 for toner.

<Production Example of External Additive Particles 5 for Toner>

External additive particles 5 for toner were obtained in the same manner as in the production example of external additive particles 1 for toner, except that the stirring temperature in the hydrolysis step was changed to 40° C., and the amount of 25% aqueous ammonia used in the polycondensation step was changed to 2.3 g. Table 1 shows the physical characteristics of the obtained external additive particles 5 for toner.

<Production Example of External Additive Particles 6 for Toner>

External additive particles 6 for toner were obtained in the same manner as in the production example of external additive particles 1 for toner, except that the stirring temperature in the hydrolysis step was changed to 50° C., and in the polycondensation step, the amount of RO water was changed to 98.8 g, the amount of methanol was changed to 310.0 g, and the amount of 25% aqueous ammonia was changed to 1.5 g. Table 1 shows the physical characteristics of the obtained external additive particles 6 for toner.

<Production Example of External Additive Particles 7 for Toner>

External additive particles 7 for toner were obtained in the same manner as in the production example of external additive particles 1 for toner, except that the stirring temperature in the hydrolysis step was changed to 40° C., and in the polycondensation step, the amount of RO water was changed to 58.8 g, the amount of methanol was changed to 350.0 g, and the amount of 25% aqueous ammonia was changed to 2.5 g. Table 1 shows the physical characteristics of the obtained external additive particles 7 for toner.

<Production Example of External Additive Particles 8 for Toner>

External additive particles 8 for toner were obtained in the same manner as in the production example of external additive particles 1 for toner, except that the stirring time of the mixed solution after dropwise addition of the raw material solution in the polycondensation step was changed to 1.0 h. Table 1 shows the physical characteristics of the obtained external additive particles 8 for toner.

<Production Example of External Additive Particles 9 for Toner>

External additive particles 9 for toner were obtained in the same manner as in the production example of external additive particles 1 for toner, except that the stirring time of the mixed solution after dropwise addition of the raw material solution in the polycondensation step was changed to 2.0 h. Table 1 shows the physical characteristics of the obtained external additive particles 9 for toner.

<Production Example of External Additive Particles 10 for Toner>

External additive particles 10 for toner were obtained in the same manner as in the production example of external additive particles 1 for toner, except that the stirring time in the hydrolysis step was changed to 1.0 h, and the stirring time of the mixed solution after dropwise addition of the raw material solution in the polycondensation step was changed to 1.0 h. Table 1 shows the physical characteristics of the obtained external additive particles 10 for toner.

<Production Example of External Additive Particles 11 for Toner>

External additive particles 11 for toner were obtained in the same manner as in the production example of external additive particles 1 for toner, except that the stirring time in the hydrolysis step was changed to 2.0 h, and the stirring time of the mixed solution after dropwise addition of the raw material solution in the polycondensation step was changed to 2.0 h. Table 1 shows the physical characteristics of the obtained external additive particles 11 for toner.

<Production Example of External Additive Particles 12 for Toner>

External additive particles 12 for toner were obtained in the same manner as in the production example of external additive particles 1 for toner, except that the hydrophobizing agent used in the hydrophobization step was changed to octamethylcyclotetrasiloxane. Table 1 shows the physical characteristics of the obtained external additive particles 12 for toner.

<Production Example of External Additive Particles 13 for Toner>

External additive particles 13 for toner were obtained in the same manner as in the production example of external additive particles 1 for toner, except that the hydrophobizing agent used in the hydrophobization step was changed to chlorotrimethylsilane. Table 1 shows the physical characteristics of the obtained external additive particles 13 for toner.

<Production Example of External Additive Particles 14 for Toner>

External additive particles 14 for toner were obtained in the same manner as in the production example of external additive particles 1 for toner, except that the hydrophobizing agent used in the hydrophobization step was changed to trifluoropropyltrimethoxysilane. Table 1 shows the physical characteristics of the obtained external additive particles 14 for toner.

<Production Example of External Additive Particles 15 for Toner>

External additive particles 15 for toner were obtained in the same manner as in the production example of external additive particles 1 for toner, except that the hydrophobizing agent used in the hydrophobization step was changed to dimethyl silicone oil. Table 1 shows the physical characteristics of the obtained external additive particles 15 for toner.

<Production Example of External Additive Particles 16 for Toner>

External additive particles 16 for toner were obtained in the same manner as in the production example of external additive particles 1 for toner, except that no hydrophobizing agent was added in the hydrophobization step. Table 1 shows the physical characteristics of the obtained external additive particles 16 for toner.

<Production Example of External Additive Particles 17 for Toner>

External additive particles 17 for toner were obtained in the same manner as in the production example of external additive particles 1 for toner, except that in the hydrolysis step, the amount of tetraethoxysilane was changed to 30.1 g and the amount of dimethyldimethoxysilane was changed to 24.3 g. Table 1 shows the physical characteristics of the obtained external additive particles 17 for toner.

<Production Example of External Additive Particles 18 for Toner>

External additive particles 18 for toner were obtained in the same manner as in the production example of external additive particles 1 for toner, except that in the hydrolysis step, the amount of tetraethoxysilane was changed to 23.5 g and the amount of dimethyldimethoxysilane was changed to 30.9 g. Table 1 shows the physical characteristics of the obtained external additive particles 18 for toner.

<Production Example of External Additive Particles 19 for Toner>

External additive particles 19 for toner were obtained in the same manner as in the production example of external additive particles 1 for toner, except that in the hydrolysis step, the amount of tetraethoxysilane was changed to 33.8 g and the amount of dimethyldimethoxysilane was changed to 20.6 g. Table 1 shows the physical characteristics of the obtained external additive particles 19 for toner.

<Production Example of External Additive Particles 20 for Toner>

External additive particles 20 for toner were obtained in the same manner as in the production example of external additive particles 1 for toner, except that the stirring time in the hydrolysis step was changed to 2.0 h, and the stirring time of the mixed solution after dropwise addition of the raw material solution in the polycondensation step was changed to 2.5 h. Table 1 shows the physical characteristics of the obtained external additive particles 20 for toner.

<Production Example of External Additive Particles 21 for Toner>

External additive particles 21 for toner were obtained in the same manner as in the production example of external additive particles 1 for toner, except that the stirring temperature and stirring time in the hydrolysis step were changed to 35° C. and 1.0 h, respectively, and the stirring time of the mixed solution after dropwise addition of the raw material solution in the polycondensation step was changed to 1.0 h. Table 1 shows the physical characteristics of the obtained external additive particles 21 for toner.

<Production Example of External Additive Particles 22 for Toner>

External additive particles 22 for toner were obtained in the same manner as in the production example of external additive particles 1 for toner, except that in the hydrolysis step, the amount of tetraethoxysilane was changed to 16.9 g, the amount of dimethyldimethoxysilane was changed to 18.6 g, 18.9 g of trimethoxymethylsilane was further added, the stirring temperature was changed to 30° C., and the stirring time was changed to 0.5 h. Table 1 shows the physical characteristics of the obtained external additive particles 22 for toner.

Production Example of External Additive Particles 23 for Toner

External additive particles 23 for toner were obtained in the same manner as in the production example of external additive particles 1 for toner, except that in the hydrolysis step, the amount of tetraethoxysilane was changed to 30.1 g, the amount of dimethyldimethoxysilane was changed to 8.2 g, 16.1 g of trimethoxymethylsilane was further added, the stirring temperature was changed to 30° C., and the stirring time was changed to 0.5 h. Table 1 shows the physical characteristics of the obtained external additive for toner particles 23.

Production Example of External Additive Particles 24 for Toner

External additive particles 24 for toner were obtained in the same manner as in the production example of external additive particles 1 for toner, except that in the hydrolysis step, the amount of tetraethoxysilane was changed to 15.4 g, the amount of dimethyldimethoxysilane was changed to 8.2 g, 30.8 g of trimethoxymethylsilane was further added, the stirring temperature was changed to 30° C., and the stirring time was changed to 0.5 h. Table 1 shows the physical characteristics of the obtained external additive for toner particles 24.

Production Example of External Additive Particles 25 for Toner

External additive particles 25 for toner were obtained in the same manner as in the production example of external additive particles 1 for toner, except that in the hydrolysis step, the amount of tetraethoxysilane was changed to 22.1 g, the amount of dimethyldimethoxysilane was changed to 21.6 g, and 10.7 g of trimethylsilanol was further added. Table 1 shows the physical characteristics of the obtained external additive for toner particles 25.

Production Example of External Additive Particles 26 for Toner

Figure 2:
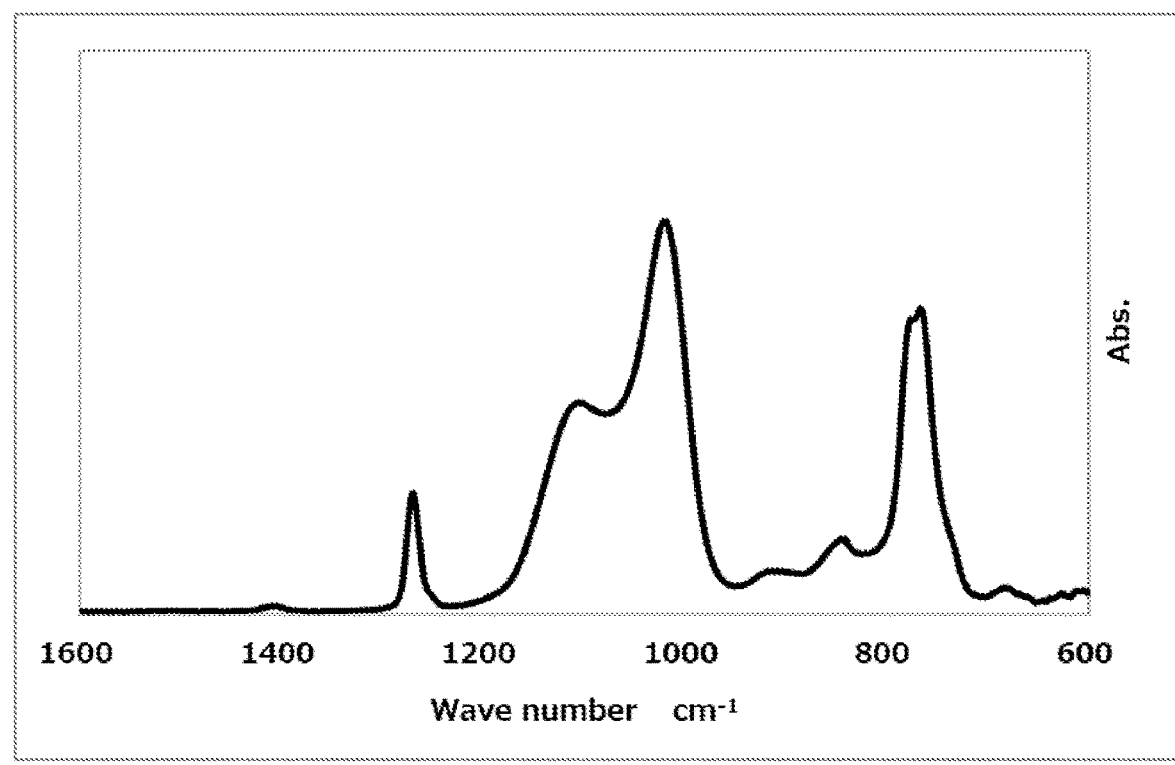
FIG. 2 is an FT-IR spectrum.

External additive particles 26 for toner were obtained in the same manner as in the production example of external additive particles 1 for toner, except that in the hydrolysis step, tetraethoxysilane and dimethyldimethoxysilane were not added, 54.4 g of trimethoxymethylsilane was added thereinstead, the stirring temperature was changed to 30° C., and the stirring time was changed to 0.5 h. Table 1 shows the physical characteristics of the obtained external additive for toner particles 26. The FT-IR spectrum of the external additive particles 26 for toner is shown in FIG. 2.

Production Example of External Additive Particles 27 for Toner

External additive particles 27 for toner were obtained in the same manner as in the production example of external additive particles 26 for toner, except that the amount of trimethoxymethylsilane was changed to 50.6 g and 3.8 g of tetraethoxysilane was added. Table 1 shows the physical characteristics of the obtained external additive for toner particles 27.

Production Example of External Additive Particles 28 for Toner

External additive particles 28 for toner were obtained in the same manner as in the production example of external additive particles 26 for toner, except that the amount of trimethoxymethylsilane was changed to 45.2 g and 9.2 g of dimethyldimethoxysilane was added. Table 1 shows the physical characteristics of the obtained external additive for toner particles 28.

Production Example of External Additive Particles 29 for Toner

A total of 124.0 g of ethanol, 24.0 g of RO water, and 10.0 g of 28% ammonia water were added in a 2000 ml beaker, the solution was adjusted to 70° C., and 232.0 g of tetraethoxysilane and 84.0 g of 5.4% aqueous ammonia were together dropwise added over 0.5 h. After the dropwise addition was completed, the mixture was further stirred for 0.5 h and hydrolyzed to obtain a dispersion liquid of silicon polymer particles having a siloxane bond.

Figure 3:
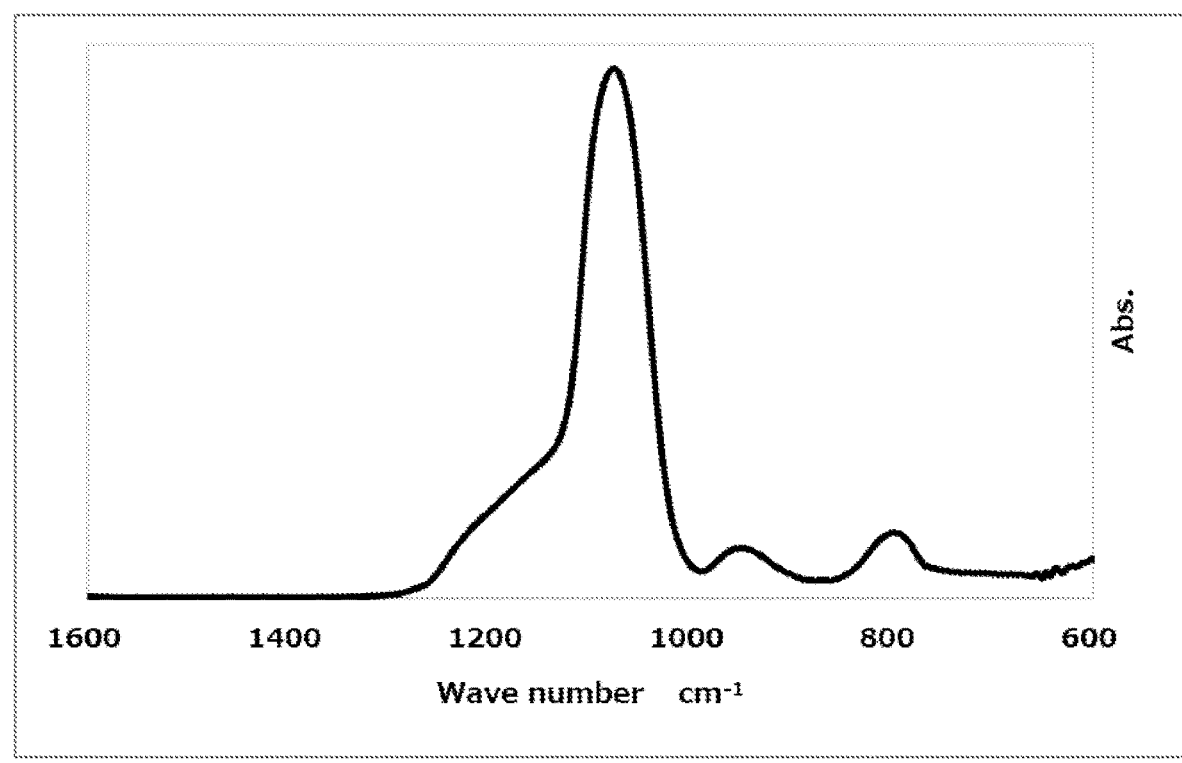
FIG. 3 is an FT-IR spectrum.

After adding 95.0 g of hexamethyldisilazane to the dispersion liquid of silicon polymer particles having a siloxane bond, which was obtained in the above step, at room temperature, the dispersion was heated to from 50° C. to 60° C. and stirred for 3.0 h. Then, the powder in the dispersion liquid was collected by suction filtration and dried under reduced pressure at 120° C. for 24 h to obtain external additive particles 29 for toner. Table 1 shows the physical characteristics of the obtained external additive particles 29 for toner. The FT-IR spectrum of the external additive particles 29 for toner is shown in FIG. 3.

<Production Example of External Additive Particles 30 for Toner>

External additive particles 30 for toner were obtained in the same manner as in the production example of external additive particles 29 for toner, except that the amount of tetraethoxysilane was changed to 208.8 g and 23.2 g of trimethoxymethylsilane was added. Table 1 shows the physical characteristics of the obtained external additive particles 30 for toner.

TABLE 1

| External additive No. for toner | Monomer composition mol % | | | | Solid-state $^{29}$Si-NMR | | | Hydrophobizing agent for surface treatment | DH % |
|---|---|---|---|---|---|---|---|---|---|
| | Q unit | T unit | D unit | M unit | S4/SA | S3/SA | S2/SA | | |
| 1 | 37 | — | 63 | — | 0.37 | 0.00 | 0.63 | Hexamethyldisilazane | 53 |
| 2 | 37 | — | 63 | — | 0.37 | 0.00 | 0.63 | Hexamethyldisilazane | 47 |
| 3 | 37 | — | 63 | — | 0.37 | 0.00 | 0.63 | Hexamethyldisilazane | 55 |
| 4 | 37 | — | 63 | — | 0.37 | 0.00 | 0.63 | Hexamethyldisilazane | 53 |
| 5 | 37 | — | 63 | — | 0.37 | 0.00 | 0.63 | Hexamethyldisilazane | 53 |
| 6 | 37 | — | 63 | — | 0.37 | 0.00 | 0.63 | Hexamethyldisilazane | 53 |
| 7 | 37 | — | 63 | — | 0.37 | 0.00 | 0.63 | Hexamethyldisilazane | 53 |
| 8 | 37 | — | 63 | — | 0.37 | 0.00 | 0.63 | Hexamethyldisilazane | 53 |
| 9 | 37 | — | 63 | — | 0.37 | 0.00 | 0.63 | Hexamethyldisilazane | 53 |
| 10 | 37 | — | 63 | — | 0.37 | 0.00 | 0.63 | Hexamethyldisilazane | 53 |
| 11 | 37 | — | 63 | — | 0.37 | 0.00 | 0.63 | Hexamethyldisilazane | 53 |
| 12 | 37 | — | 63 | — | 0.37 | 0.00 | 0.63 | Octamethyl cyclotetrasiloxane | 47 |
| 13 | 37 | — | 63 | — | 0.37 | 0.00 | 0.63 | Chlorotrimethylsilane | 43 |
| 14 | 37 | — | 63 | — | 0.37 | 0.00 | 0.63 | Trifluoropropyl trimethoxysilane | 45 |
| 15 | 37 | — | 63 | — | 0.37 | 0.00 | 0.63 | Dimethyl silicone oil | 35 |
| 16 | 37 | — | 63 | — | 0.37 | 0.00 | 0.63 | None | 45 |
| 17 | 41 | — | 59 | — | 0.41 | 0.00 | 0.59 | Hexamethyldisilazane | 53 |

TABLE 1-continued

| | | | | | | | | | |
|---|---|---|---|---|---|---|---|---|---|
| 18 | 32 | — | 68 | — | 0.32 | 0.00 | 0.68 | Hexamethyldisilazane | 53 |
| 19 | 46 | — | 54 | — | 0.46 | 0.00 | 0.54 | Hexamethyldisilazane | 53 |
| 20 | 37 | — | 63 | — | 0.37 | 0.00 | 0.63 | Hexamethyldisilazane | 53 |
| 21 | 37 | — | 63 | — | 0.37 | 0.00 | 0.63 | Hexamethyldisilazane | 53 |
| 22 | 23 | 34 | 43 | — | 0.23 | 0.34 | 0.43 | Hexamethyldisilazane | 43 |
| 23 | 41 | 40 | 19 | — | 0.41 | 0.40 | 0.19 | Hexamethyldisilazane | 43 |
| 24 | 21 | 60 | 19 | — | 0.21 | 0.60 | 0.19 | Hexamethyldisilazane | 43 |
| 25 | 30 | — | 50 | 20 | 0.30 | 0.00 | 0.50 | Hexamethyldisilazane | 48 |
| 26 | — | 100 | — | — | 0.00 | 1.00 | 0.00 | Hexamethyldisilazane | 35 |
| 27 | 7 | 93 | — | — | 0.07 | 0.93 | 0.00 | Hexamethyldisilazane | 34 |
| 28 | — | 83 | 17 | — | 0.00 | 0.83 | 0.17 | Hexamethyldisilazane | 40 |
| 29 | 100 | — | — | — | 1.00 | 0.00 | 0.00 | Hexamethyldisilazane | 45 |
| 30 | 90 | 10 | — | — | 0.90 | 0.10 | 0.00 | Hexamethyldisilazane | 44 |

| External additive No. for toner | FT-IR spectrum | | | | YM | YP | PD | AC |
|---|---|---|---|---|---|---|---|---|
| | MPP | A | B | A/B | X | Mpa | Mpa | μm | |
| 1 | 1044 | 0.17 | 0.17 | 1.04 | 1260 | 6200 | 1600 | 0.12 | 0.890 |
| 2 | 1044 | 0.17 | 0.17 | 1.04 | 1260 | 6200 | 1600 | 0.12 | 0.890 |
| 3 | 1044 | 0.17 | 0.17 | 1.04 | 1260 | 6200 | 1600 | 0.12 | 0.890 |
| 4 | 1044 | 0.17 | 0.17 | 1.04 | 1260 | 6200 | 1600 | 0.05 | 0.890 |
| 5 | 1044 | 0.17 | 0.17 | 1.04 | 1260 | 6200 | 1600 | 0.20 | 0.890 |
| 6 | 1044 | 0.17 | 0.17 | 1.04 | 1260 | 6200 | 1600 | 0.01 | 0.890 |
| 7 | 1044 | 0.17 | 0.17 | 1.04 | 1260 | 6200 | 1600 | 0.35 | 0.890 |
| 8 | 1044 | 0.17 | 0.17 | 1.04 | 1260 | 6000 | 1600 | 0.12 | 0.860 |
| 9 | 1044 | 0.17 | 0.17 | 1.04 | 1260 | 6300 | 1600 | 0.12 | 0.940 |
| 10 | 1044 | 0.17 | 0.17 | 1.04 | 1260 | 5800 | 1600 | 0.12 | 0.840 |
| 11 | 1044 | 0.17 | 0.17 | 1.04 | 1260 | 6800 | 1600 | 0.12 | 0.960 |
| 12 | 1044 | 0.17 | 0.17 | 1.04 | 1260 | 6200 | 1600 | 0.12 | 0.890 |
| 13 | 1044 | 0.17 | 0.17 | 1.04 | 1260 | 6200 | 1600 | 0.12 | 0.890 |
| 14 | 1044 | 0.17 | 0.17 | 1.04 | 1260 | 6200 | 1600 | 0.12 | 0.890 |
| 15 | 1044 | 0.17 | 0.17 | 1.04 | 1260 | 6200 | 1600 | 0.12 | 0.890 |
| 16 | 1044 | 0.17 | 0.17 | 1.04 | 1260 | 6200 | 1600 | 0.12 | 0.890 |
| 17 | 1063 | 0.06 | 0.11 | 0.57 | 1263 | 7300 | 1650 | 0.12 | 0.890 |
| 18 | 1048 | 0.13 | 0.16 | 0.83 | 1258 | 3700 | 1180 | 0.12 | 0.890 |
| 19 | 1047 | 0.18 | 0.19 | 0.95 | 1264 | 9200 | 1820 | 0.12 | 0.890 |
| 20 | 1044 | 0.17 | 0.17 | 1.04 | 1260 | 7500 | 1800 | 0.12 | 0.960 |
| 21 | 1044 | 0.17 | 0.17 | 1.04 | 1260 | 5500 | 1200 | 0.12 | 0.890 |
| 22 | 1048 | 0.05 | 0.06 | 0.78 | 1260 | 5800 | 1580 | 0.12 | 0.890 |
| 23 | 1050 | 0.15 | 0.11 | 1.36 | 1261 | 6800 | 1620 | 0.12 | 0.890 |
| 24 | 1033 | 0.16 | 0.11 | 1.45 | 1263 | 6300 | 1600 | 0.12 | 0.890 |
| 25 | 1042 | 0.18 | 0.16 | 1.13 | 1255 | 5200 | 1550 | 0.12 | 0.890 |
| 26 | 1021 | 0.28 | 0.14 | 1.90 | 1270 | 6200 | 1300 | 0.11 | 0.910 |
| 27 | 1028 | 0.28 | 0.15 | 1.90 | 1270 | 10000 | 1300 | 0.12 | 0.890 |
| 28 | 1029 | 0.06 | 0.04 | 1.50 | 1268 | 2400 | 850 | 0.13 | 0.890 |
| 29 | 1078 | 0.06 | 0.37 | 0.20 | None | 71000 | 1600 | 0.11 | 0.930 |
| 30 | 1079 | 0.06 | 0.37 | 0.20 | None | 55000 | 1600 | 0.11 | 0.920 |

In the table, the monomer composition shows the molar ratio. DH indicates Degree of hydrophobization. MPP indicates Maximum peak position which is the position of the maximum peak ($cm^{-1}$) in the FT-IR spectrum. X indicates a peak position in the range of from 1200 $cm^{-1}$ to 1300 $cm^{-1}$, and "None" is used when the peak is not present. YM indicates Young's modulus, YP indicates yield point stress, PD indicates "the number-average particle diameter of primary particles", and AC indicates Average circularity.

<Production Example of Polyester Resin A1>

| | |
|---|---|
| Polyoxypropylene(2.2)-2,2-bis(4-hydroxyphenyl)propane | 76.9 parts (0.167 mol parts) |
| Terephthalic acid (TPA) | 25.0 parts (0.145 mol parts) |
| Adipic acid | 8.0 parts (0.054 mol parts) |
| Titanium tetrabutoxide | 0.5 parts |

The above materials were placed in a 4-liter glass four-necked flask, a thermometer, a stirring rod, a condenser and a nitrogen introduction tube were attached to the flask, and the flask with the attachments was placed in a mantle heater. Next, the inside of the flask was replaced with nitrogen gas, the temperature was gradually raised while stirring, and the reaction was carried out for 4 h while stirring at a temperature of 200° C. After that, 1.2 parts (0.006 mol parts) of trimellitic anhydride (TMA) was added and reacted at 180° C. for 1 h to obtain a polyester resin A1. The softening temperature of the polyester resin A1 was 90° C.

<Production Example of Polyester Resin A2>

| | |
|---|---|
| Polyoxypropylene(2.2)-2,2-bis(4-hydroxyphenyl) propane | 71.3 parts (0.155 mol parts) |
| Terephthalic acid | 24.1 parts (0.145 mol parts) |
| Titanium tetrabutoxide | 0.6 parts |

The above materials were placed in a 4-liter glass four-necked flask, a thermometer, a stirring rod, a condenser and a nitrogen introduction tube were attached to the flask, and the flask with the attachments was placed in a mantle heater. Next, the inside of the flask was replaced with nitrogen gas, the temperature was gradually raised while stirring, and the reaction was carried out for 2 h while stirring at a temperature of 200° C. After that, 5.8 parts (0.030 mol parts) of trimellitic anhydride was added and reacted at 180° C. for 10 h to obtain a polyester resin A2. The softening temperature of the polyester resin A2 was 130° C.

Production Example of Toner Particle 1

| Polyester Resin A1 | 70.0 parts |
|---|---|
| Polyester Resin A2 | 30.0 parts |
| Fischer-Tropsch wax (peak temperature of 78° C. of maximum endothermic peak) | 5.0 parts |
| C.I. Pigment blue 15:3 | 5.0 parts |
| Aluminum 3,5-di-t-butyl salicylate compound | 0.1 part |

The starting materials in the above formulation were mixed using a Henschel mixer (FM-75 model, by Nippon Coke & Engineering Co., Ltd.) at a rotational speed of $20\ s^{-1}$ and for a rotation time of 5 min, followed by kneading using a twin-screw kneader (PCM-30 model, by Ikegai Corp.) set to a temperature of 125° C. and a rotational speed of 300 rpm. The obtained kneaded product was cooled and coarsely pulverized with a hammer mill to a diameter of 1 mm or less, to obtain a coarsely pulverized product. The obtained coarsely pulverized product was finely pulverized using a mechanical crusher (T-250, by Freund Turbo Corporation).

Further, a rotary classifier (200 TSP, by Hosokawa Micron Corporation) was used for classification, to obtain Toner particle 1. The operating conditions of the rotary classifier (200 TSP, by Hosokawa Micron Corporation) involved herein classification performed at a rotational speed of $50.0\ s^{-1}$ of the classification rotor. The obtained toner particles 1 had a weight-average particle diameter (D4) of 5.9 μm, a Young's modulus of 4000 MPa, and a yield point stress of 1000 MPa.

Production Example of Toner Particles 2

Toner particles 2 were obtained in the same manner as in the production example of toner particles 1, except that in the production example of toner particles 1, the amount of the polyester resin A1 was changed to 85.0 parts and the amount of the polyester resin A2 was changed to 15.0 parts. The obtained toner particles 2 had a weight-average particle diameter (D4) of 5.9 μm, a Young's modulus of 3000 MPa, and a yield point stress of 700 MPa.

Production Example of Toner Particles 3

Toner particles 3 were obtained in the same manner as in the production example of toner particles 1, except that in the production example of toner particles 1, the amount of the polyester resin A1 was changed to 60.0 parts and the amount of the polyester resin A2 was changed to 40.0 parts. The obtained toner particles 3 had a weight-average particle diameter (D4) of 5.9 μm, a Young's modulus of 5000 MPa, and a yield point stress of 1200 MPa.

Production Example of Toner Particles 4

Preparation of Styrene Acrylic Resin Particle-Dispersed Solution

A total of 89.5 parts of styrene, 9.2 parts of butyl acrylate, 1.3 parts of acrylic acid, and 3.2 parts of n-lauryl mercaptan were mixed and dissolved. An aqueous solution prepared by mixing 1.5 parts of Neogen RK (manufactured by Dai-ichi Kogyo Seiyaku Co., Ltd.) with 150 parts of ion exchanged water was added to this mixed solution, followed by dispersing. An aqueous solution prepared by mixing 0.3 parts of potassium persulfate with 10 parts of ion exchanged water was further added while stirring slowly for 10 min. After nitrogen replacement, emulsion polymerization was carried out at 70° C. for 6 h. After completion of the polymerization, the reaction solution was cooled to room temperature, and ion exchanged water was added to obtain a styrene-acrylic resin particle-dispersed solution.

Preparation of Release Agent-Dispersed Solution

A total of 100 parts of a release agent (behenyl behenate, melting point: 72.1° C.) and 15 parts of Neogen RK were mixed with 385 parts of ion exchanged water and dispersed for about 1 h using a wet jet mill JN100 (manufactured by Tsunemitsu Co., Ltd.) to obtain a release agent-dispersed solution. The solid content concentration of the release agent-dispersed solution was 20% by mass.

Preparation of Colorant-Dispersed Solution

A total of 100 parts of C.I. Pigment Blue 15:3 and 15 parts of Neogen RK were mixed with 885 parts of ion exchanged water and dispersed for about 1 h using a wet jet mill JN100 to obtain a colorant-dispersed solution.

Preparation of Toner Particles 4

A total of 265 parts of the styrene acrylic resin particle-dispersed solution, 10 parts of the release agent-dispersed solution and 10 parts of the colorant-dispersed solution were placed in a container and dispersed using a homogenizer (ULTRA-TURRAX T50, manufactured by IKA). The temperature inside the container was adjusted to 30° C. under stirring, and 1 mol/L hydrochloric acid was added to adjust the pH to 5.0. After allowing to stand for 3 min, the temperature rise was started and the temperature was raised to 50° C. to generate aggregated particles. In that state, the particle diameter of the aggregated particles was measured with "Coulter Counter Multisizer 3" (registered trademark, manufactured by Beckman Coulter Inc.).

When the weight-average particle diameter of the aggregated particles reached 6.2 μm, 1 mol/L sodium hydroxide aqueous solution was added to adjust the pH to 8.0 to stop the particle growth. Then, the temperature was raised to 95° C., and the aggregated particles were fused and spheroidized. When the average circularity reached 0.980, the temperature lowering was started, and the temperature was lowered to 30° C. to obtain a toner particle-dispersed solution 1.

Hydrochloric acid was added to the obtained toner particle-dispersed solution 1 to adjust the pH to 1.5 or less, and the mixture was stirred for 1 h and then solid-liquid separated with a pressure filter to obtain a toner cake. This was reslurried with ion exchanged water to form a dispersion liquid again, and then solid-liquid separation was performed with the above-mentioned filter. The reslurrying and solid-liquid separation were repeated until the electrical conductivity of the filtrate became 5.0 μS/cm or less, and then solid-liquid separation was finally performed to obtain a toner cake.

The obtained toner cake was dried with an airflow dryer, Flash Jet Dryer (manufactured by Seishin Enterprise Co., Ltd.). The drying conditions were a blowing temperature of 90° C., a dryer outlet temperature of 40° C., and a toner cake supply speed adjusted according to the water content of the toner cake to a speed at which the outlet temperature did not deviate from 40° C. Further, the fine and coarse powders were cut using a multi-division classifier utilizing the Coanda effect to obtain toner particles 4. The obtained toner particles 4 had a weight-average particle diameter (D4) of 5.9 μm, a Young's modulus of 4500 MPa, and a yield point stress of 1400 MPa.

<Production Example of Toner 1>

| Toner particles 1 | 100 parts |
|---|---|
| External additive particles 1 for toner | 6.0 parts |

The above materials were mixed with a Henschel mixer FM-10C type (manufactured by Mitsui Miike Machinery Co., Ltd.) at a rotation speed of 30 s$^{-1}$ for a rotation time of 10 min to obtain toner 1.

<Production Examples of Toners 2 to 38>

Toners 2 to 38 were obtained in the same manner as in the production example of toner 1, except that the toner particles and the external additive for toner were changed to those shown in Table 2.

TABLE 2

| Toner No. | Toner particle No. | External additive No. for toner | Amount added |
|---|---|---|---|
| Toner 1 | Toner particle 1 | External additive particle 1 | 6.0 |
| Toner 2 | Toner particle 1 | External additive particle 2 | 6.0 |
| Toner 3 | Toner particle 1 | External additive particle 3 | 6.0 |
| Toner 4 | Toner particle 1 | External additive particle 4 | 6.0 |
| Toner 5 | Toner particle 1 | External additive particle 5 | 6.0 |
| Toner 6 | Toner particle 1 | External additive particle 6 | 6.0 |
| Toner 7 | Toner particle 1 | External additive particle 7 | 6.0 |
| Toner 8 | Toner particle 1 | External additive particle 8 | 6.0 |
| Toner 9 | Toner particle 1 | External additive particle 9 | 6.0 |
| Toner 10 | Toner particle 1 | External additive particle 10 | 6.0 |
| Toner 11 | Toner particle 1 | External additive particle 11 | 6.0 |
| Toner 12 | Toner particle 1 | External additive particle 12 | 6.0 |
| Toner 13 | Toner particle 1 | External additive particle 13 | 6.0 |
| Toner 14 | Toner particle 1 | External additive particle 14 | 6.0 |
| Toner 15 | Toner particle 1 | External additive particle 15 | 6.0 |
| Toner 16 | Toner particle 1 | External additive particle 16 | 6.0 |
| Toner 17 | Toner particle 1 | External additive particle 17 | 6.0 |
| Toner 18 | Toner particle 1 | External additive particle 18 | 6.0 |
| Toner 19 | Toner particle 1 | External additive particle 19 | 6.0 |
| Toner 20 | Toner particle 1 | External additive particle 20 | 6.0 |
| Toner 21 | Toner particle 1 | External additive particle 21 | 6.0 |
| Toner 22 | Toner particle 1 | External additive particle 22 | 6.0 |
| Toner 23 | Toner particle 1 | External additive particle 23 | 6.0 |
| Toner 24 | Toner particle 1 | External additive particle 24 | 6.0 |
| Toner 25 | Toner particle 1 | External additive particle 25 | 6.0 |
| Toner 26 | Toner particle 2 | External additive particle 16 | 6.0 |
| Toner 27 | Toner particle 3 | External additive particle 16 | 6.0 |
| Toner 28 | Toner particle 4 | External additive particle 16 | 6.0 |
| Toner 29 | Toner particle 1 | External additive particle 16 | 3.0 |
| Toner 30 | Toner particle 1 | External additive particle 16 | 0.2 |
| Toner 31 | Toner particle 1 | External additive particle 16 | 18.0 |
| Toner 32 | Toner particle 1 | External additive particle 16 | 21.0 |
| Toner 33 | Toner particle 1 | External additive particle 16 | 0.1 |
| Toner 34 | Toner particle 1 | External additive particle 26 | 6.0 |
| Toner 35 | Toner particle 1 | External additive particle 27 | 6.0 |
| Toner 36 | Toner particle 1 | External additive particle 28 | 6.0 |
| Toner 37 | Toner particle 1 | External additive particle 29 | 6.0 |
| Toner 38 | Toner particle 1 | External additive particle 30 | 6.0 |

In the table, the amount added is the number of parts per 100 parts of toner particles.

Production Example of Carrier 1

Magnetite 1 (intensity of magnetization of 65 Am$^2$/kg in a 1000/4n (kA/m) magnetic field), having a number-average particle diameter of 0.30

Magnetite 2 (intensity of magnetization of 65 Am$^2$/kg in a 1000/4n (kA/m) magnetic field), having a number-average particle diameter of 0.50

Herein 4.0 parts of a silane compound (3-(2-aminoethyl-aminopropyl) trimethoxysilane) were added to 100 parts of each of the above materials, with high-speed mixing and stirring at 100° C. or above, inside the vessel, to treat the respective fine particles.

Phenol: 10 mass %

Formaldehyde solution: 6 mass % (formaldehyde 40 mass %, methanol 10 mass %, water 50 mass %)

Magnetite 1 treated with the above silane compound: 58 mass %

Magnetite 2 treated with the above silane compound: 26 mass %

Then 100 parts of the above materials, 5 parts of a 28 mass % aqueous ammonia solution, and 20 parts of water were charged into a flask, the temperature was raised to 85° C. over 30 minutes while under mixing by stirring, and a polymerization reaction was conducted by holding that temperature for 3 hours, to cure the generated phenolic resin. The cured phenolic resin was then cooled down to 30° C., followed by further addition of water, after which the supernatant was removed, and the precipitate was washed with water and was subsequently air-dried. Next, the resulting product was dried under reduced pressure (5 mmHg or lower) at a temperature of 60° C., to yield a spherical Carrier 1 of magnetic body-dispersed type. The volume-basis 50% particle diameter (D50) of Carrier 1 was 34.2

Production Example of Two-Component Developer 1

Herein 8.0 parts of Toner 1 were added to 92.0 parts of Carrier 1, with mixing using a V-type mixer (V-20, by Seishin Enterprise Co., Ltd.), to obtain Two-component developer 1.

Production Example of Two-Component Developers 2 to 38

Two-component developers 2 to 38 were produced in the same way as in the production example of Two-component developer 1, but herein the toner was modified as given in Table 3.

TABLE 3

| Two-component developer No. | Toner No. | Carrier No. |
|---|---|---|
| Two-component developer 1 | Toner 1 | Carrier 1 |
| Two-component developer 2 | Toner 2 | Carrier 1 |
| Two-component developer 3 | Toner 3 | Carrier 1 |
| Two-component developer 4 | Toner 4 | Carrier 1 |
| Two-component developer 5 | Toner 5 | Carrier 1 |
| Two-component developer 6 | Toner 6 | Carrier 1 |
| Two-component developer 7 | Toner 7 | Carrier 1 |
| Two-component developer 8 | Toner 8 | Carrier 1 |
| Two-component developer 9 | Toner 9 | Carrier 1 |
| Two-component developer 10 | Toner 10 | Carrier 1 |
| Two-component developer 11 | Toner 11 | Carrier 1 |
| Two-component developer 12 | Toner 12 | Carrier 1 |
| Two-component developer 13 | Toner 13 | Carrier 1 |
| Two-component developer 14 | Toner 14 | Carrier 1 |
| Two-component developer 15 | Toner 15 | Carrier 1 |
| Two-component developer 16 | Toner 16 | Carrier 1 |
| Two-component developer 17 | Toner 17 | Carrier 1 |
| Two-component developer 18 | Toner 18 | Carrier 1 |
| Two-component developer 19 | Toner 19 | Carrier 1 |
| Two-component developer 20 | Toner 20 | Carrier 1 |
| Two-component developer 21 | Toner 21 | Carrier 1 |
| Two-component developer 22 | Toner 22 | Carrier 1 |
| Two-component developer 23 | Toner 23 | Carrier 1 |
| Two-component developer 24 | Toner 24 | Carrier 1 |
| Two-component developer 25 | Toner 25 | Carrier 1 |
| Two-component developer 26 | Toner 26 | Carrier 1 |
| Two-component developer 27 | Toner 27 | Carrier 1 |
| Two-component developer 28 | Toner 28 | Carrier 1 |
| Two-component developer 29 | Toner 29 | Carrier 1 |
| Two-component developer 30 | Toner 30 | Carrier 1 |
| Two-component developer 31 | Toner 31 | Carrier 1 |
| Two-component developer 32 | Toner 32 | Carrier 1 |
| Two-component developer 33 | Toner 33 | Carrier 1 |
| Two-component developer 34 | Toner 34 | Carrier 1 |
| Two-component developer 35 | Toner 35 | Carrier 1 |
| Two-component developer 36 | Toner 36 | Carrier 1 |
| Two-component developer 37 | Toner 37 | Carrier 1 |
| Two-component developer 38 | Toner 38 | Carrier 1 |

<Toner Evaluation Method>

(1) Measurement of Change in Image Density

A Canon full-color copier imagePress C800 was used as an image forming apparatus, the two-component developer was placed in a cyan developing device of the image forming apparatus, and the toner was placed in a cyan toner container to perform the below-described evaluation. The apparatus was modified by attaching a mechanism for discharging the excess magnetic carrier contained inside the developing device from the developing device. As the evaluation paper, plain paper GF-0081 (A4, basis weight 81.4 g/m², sold by Canon Marketing Japan Inc.) was used.

The toner laid-on level on the paper in a FFh image (solid image) was adjusted to 0.45 mg/cm². FFh is a value obtained by displaying 256 gradations in hexadecimal, 00h is the first gradation gradations (white background portion) of 256, and FF is the 256th gradation (solid portion) of 256 gradations. First, an image output test of 1000 images was performed with an image ratio of 1%. During the continuous passing of 1000 sheets, the sheets were passed under the same development conditions and transfer conditions (without calibration) as those of the first sheet.

After that, an image output test of 1000 images was performed with an image ratio of 80%. During the continuous passing of 1000 sheets, the sheets were passed under the same development conditions and transfer conditions (without calibration) as those of the first sheet. The density of the 1000-th image in printing at an image ratio of 1% was taken as the initial density, and the density of the 1000-th image in printing at an image ratio of 80% was measured and evaluated.

The above test was performed in a high-temperature and high-humidity environment (H/H; temperature 30° C., relative humidity 80%). An X-Rite color reflection densitometer (500 series: manufactured by X-Rite, Inc.) was used, the initial density and the density of the 1000-th image in printing at an image ratio of 80% were measured, and ranking was performed according to the following criteria by using the difference Δ therebetween. A rank of C or higher was determined to be good. Table 4 shows the evaluation results.

Evaluation Criteria: Image Density Difference Δ
A: less than 0.02
B: 0.02 or more and less than 0.05
C: 0.05 or more and less than 0.10
D: 0.10 or more and less than 0.15
E: 0.15 or more (2) Method for Evaluating Transferability A modified full-color copier (trade name: image RUNNER ADVANCE C5255) manufactured by Canon Inc. was used as an image forming apparatus. A solid image was output after a durability test with an image output of 70000 images in a high-temperature and high-humidity environment (30° C., 80% RH) (image with a print percentage of 1%). The untransferred toner on the photosensitive member (photosensitive drum) at the time of forming a solid image was taped with a transparent polyester adhesive tape and peeled off.

The peeled adhesive tape was attached to paper, and the density thereof was measured with a spectroscopic densitometer (500 series, X-Rite, Inc.). In addition, only the adhesive tape was attached on the paper, and the density at that time was also measured. The density difference Δ was calculated by subtracting the value of the latter density from the former density, and this density difference Δ was evaluated based on the evaluation criteria shown below.

During the continuous output of 70000 images, the images were output under the same development conditions and transfer conditions (without calibration) as the first image. In the image output durability test of 70000 copies, copy plain paper CS-680 (A4 paper, basis weight: 68 g/m², sold by Canon Marketing Japan Co., Ltd.) was used as the transfer material for evaluation. For the solid image after the output test, copy paper Multi-Purpose Paper: commonly known as Boise paper (A4 paper, basis weight: 75 g/m², sold by Canon USA) was used. Ranking was performed according to the following criteria. A rank of C or higher was determined to be good. Table 4 shows the evaluation results.

Evaluation Criteria: Image Density Difference Δ
A: less than 0.02
B: 0.02 or more and less than 0.05
C: 0.05 or more and less than 0.10
D: 0.10 or more and less than 0.15
E: 0.15 or more (3) Method for Evaluating Charge Retention The triboelectric charge quantity of the toner was calculated by sucking and collecting the toner on the electrostatic latent image bearing member by using a metal cylindrical tube and a cylindrical filter. Specifically, the triboelectric charge quantity of the toner on the electrostatic latent image bearing member was measured by a Faraday cage. The Faraday cage is a coaxial double cylinder, and the inner cylinder and outer cylinder are insulated. Where a charged body having a charge quantity of Q is placed in the inner cylinder, it is as if a metal cylinder having a charge quantity Q is present due to electrostatic induction. This induced charge quantity was measured with an electrometer (Keithley 6517A, manufactured by Keithley Co., Ltd.), and (Q/M) obtained by dividing the charge quantity Q (mC) by the toner mass M (kg) in the inner cylinder was taken as the triboelectric charge quantity of the toner.

$$\text{Triboelectric charge quantity of toner } (mC/kg) = Q/M$$

Evaluation image: a 2 cm×5 cm FFh image is placed in the center of A4 paper

First, the evaluation image was formed on the electrostatic latent image bearing member, the rotation of the electrostatic latent image bearing member was stopped before the image was transferred to the intermediate transfer body, the toner on the electrostatic latent image bearing member was sucked and collected with a cylindrical tube and a cylindrical filter, and [Initial Q/M] was measured. Subsequently, the evaluation machine with the developing device arranged therein was stored for 2 weeks in the H/H environment, and then the same operation as before the storage was performed, and the charge quantity Q/M (mC/kg) per unit mass on the electrostatic latent image bearing member after the storage was measured. The initial Q/M per unit mass on the electrostatic latent image bearing member was taken as 100%, and a retention ratio Q/M per unit mass on the electrostatic latent image bearing member after the storage ([Q/M after storage]/[Initial Q/M]×100) was calculated and evaluated according to the following criteria. A rank of C or higher was determined to be good. Table 4 shows the evaluation results.

Evaluation Criteria
A: retention rate is 98% or more
B: retention rate is 95% or more and less than 98%
C: retention rate is 90% or more and less than 95%
D: retention rate is 85% or more and less than 90%
E: retention rate is less than 85%

Evaluation Results of Examples 1 to 33

Table 4 shows the evaluation results of Examples 1 to 33.

Evaluation Results of Comparative Examples 1 to 5

Table 4 shows the evaluation results of Comparative Examples 1 to 5.

TABLE 4

| Example No. | Two-component developer No. | Image density change HH Δ | Rank | Transferability after durability HH Δ | Rank | Charge retention property HH Retention rate % | Rank |
|---|---|---|---|---|---|---|---|
| 1 | 1 | 0.01 | A | 0.01 | A | 99 | A |
| 2 | 2 | 0.01 | A | 0.01 | A | 97 | B |
| 3 | 3 | 0.01 | A | 0.01 | A | 98 | A |
| 4 | 4 | 0.01 | A | 0.02 | B | 98 | A |
| 5 | 5 | 0.01 | A | 0.03 | B | 98 | A |
| 6 | 6 | 0.03 | B | 0.03 | B | 97 | B |
| 7 | 7 | 0.04 | B | 0.02 | B | 97 | B |
| 8 | 8 | 0.01 | A | 0.03 | B | 98 | A |
| 9 | 9 | 0.01 | A | 0.03 | B | 98 | A |
| 10 | 10 | 0.04 | B | 0.04 | B | 98 | A |
| 11 | 11 | 0.04 | B | 0.04 | B | 98 | A |
| 12 | 12 | 0.01 | A | 0.01 | A | 95 | B |
| 13 | 13 | 0.01 | A | 0.01 | A | 97 | B |
| 14 | 14 | 0.01 | A | 0.01 | A | 96 | B |
| 15 | 15 | 0.01 | A | 0.01 | A | 96 | B |
| 16 | 16 | 0.03 | B | 0.03 | B | 93 | C |
| 17 | 17 | 0.04 | B | 0.06 | C | 96 | B |
| 18 | 18 | 0.05 | C | 0.05 | C | 97 | B |
| 19 | 19 | 0.05 | C | 0.09 | C | 92 | C |
| 20 | 20 | 0.03 | B | 0.03 | B | 91 | C |
| 21 | 21 | 0.03 | B | 0.04 | B | 94 | C |
| 22 | 22 | 0.04 | B | 0.08 | C | 90 | C |
| 23 | 23 | 0.03 | B | 0.09 | C | 91 | C |
| 24 | 24 | 0.07 | C | 0.07 | C | 92 | C |
| 25 | 25 | 0.04 | B | 0.08 | C | 90 | C |
| 26 | 26 | 0.01 | A | 0.04 | B | 98 | A |
| 27 | 27 | 0.04 | B | 0.03 | B | 98 | A |
| 28 | 28 | 0.04 | B | 0.03 | B | 97 | B |
| 29 | 29 | 0.03 | B | 0.04 | B | 95 | B |
| 30 | 30 | 0.03 | B | 0.09 | C | 95 | B |
| 31 | 31 | 0.08 | C | 0.04 | B | 97 | B |
| 32 | 32 | 0.09 | C | 0.09 | C | 92 | C |
| 33 | 33 | 0.08 | C | 0.09 | C | 91 | C |
| C.E. 1 | 34 | 0.15 | E | 0.15 | E | 79 | E |
| C.E. 2 | 35 | 0.15 | E | 0.14 | D | 77 | E |
| C.E. 3 | 36 | 0.11 | D | 0.16 | E | 87 | D |
| C.E. 4 | 37 | 0.09 | C | 0.12 | D | 95 | B |
| C.E. 5 | 38 | 0.08 | C | 0.13 | D | 96 | B |

In the table, C.E. indicates Comparative Example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2021-009564, filed Jan. 25, 2021, and Japanese Patent Application No. 2021-203284, filed Dec. 15, 2021, which are hereby incorporated by reference herein in their entirety.

What is claimed is:

1. An external additive for toner, comprising:
a particle of a silicon polymer having a siloxane bond and a Si—O—C bond;
the external additive being surface-treated with at least one member selected from the group consisting of an alkylsilazane compound, an alkylalkoxysilane compound, a chlorosilane compound, a siloxane compound, and a silicone oil, wherein
a maximum peak is within a range of 1030 to 1070 cm$^{-1}$ in an FT-IR spectrum of the external additive obtained by an ATR method, and $$0.55 \le A/B \le 1.50$$

when A is an average intensity in a range of 1015 to 1025 cm$^{-1}$ of the spectrum and B is an average intensity in a range of 1085 to 1095 cm$^{-1}$.

2. The external additive for toner according to claim 1, which has a Young's modulus of 2000 to 9000 MPa.

3. The external additive for toner according to claim 1, wherein the maximum peak is within a range of 1040 to 1055 cm$^{-1}$.

4. The external additive for toner according to claim 1, which has primary particles with a number-average particle diameter of 0.02 to 0.30 μm.

5. The external additive for toner according to claim 1, which has a peak in a range of from 1250 to 1300 cm$^{-1}$ in the FT-IR spectrum.

6. The external additive for toner according to claim 1, which has an average circularity of 0.850 to 0.950.

7. The external additive for toner according to claim 1, which has a yield point stress of 1200 to 10000 MPa.

8. The external additive for toner according to claim 1, wherein in a chart obtained by $^{29}$Si-NMR measurement of the external additive, $$0.20 \le S4/SA \le 0.60$$

$$0.00 \le S3/SA \le 0.50 \text{ and}$$

$$0.20 \le S2/SA \le 0.70$$

when SA is a total peak area attributed to a silicon polymer, S4 is a peak area attributed to a Q unit structure, S3 is a peak area attributed to a T unit structure, and S2 is a peak area attributed to a D unit structure.

9. The external additive for toner according to claim 1, wherein the silicon polymer is a polycondensation polymer of at least one member selected from the group consisting of bifunctional silanes and at least one member selected from the group consisting of tetrafunctional silanes.

10. The external additive for toner according to claim 1, which has a degree of hydrophobization of 50 to 60% determined by a methanol titration method.

11. A toner, comprising:
a toner particle comprising a binder resin; and
an external additive for toner;
the external additive comprising a particle of a silicon polymer having a siloxane bond and a Si—O—C bond, wherein
a maximum peak is within a range of 1030 to 1070 cm$^{-1}$ in an FT-IR spectrum of the external additive obtained by an ATR method, and $$0.55 \le A/B \le 1.50$$

when A is where an average intensity in a range of 1015 to 1025 cm$^{-1}$ of the spectrum is denoted by A and B is an average intensity in a range of 1085 to 1095 cm$^{-1}$.

12. The toner according to claim 11, wherein the content of the external additive is 0.1 to 20.0 parts by mass with respect to 100 parts by mass of the toner particles.

* * * * *